United States Patent
Wu et al.

(10) Patent No.: US 11,405,581 B2
(45) Date of Patent: Aug. 2, 2022

(54) MOTION DETECTION METHODS AND IMAGE SENSOR DEVICES CAPABLE OF GENERATING RANKING LIST OF REGIONS OF INTEREST AND PRE-RECORDING MONITORING IMAGES

(71) Applicant: PixArt Imaging Inc., Hsin-Chu (TW)

(72) Inventors: Chih-Huan Wu, Hsin-Chu (TW); Yi-Hsien Ko, Hsin-Chu (TW); Wen-Han Yao, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/326,298

(22) Filed: May 20, 2021

(65) Prior Publication Data

US 2021/0329193 A1 Oct. 21, 2021

Related U.S. Application Data

(63) Continuation-in-part of application No. 17/151,625, filed on Jan. 18, 2021, and a continuation-in-part of application No. 16/924,285, filed on Jul. 9, 2020, now Pat. No. 11,212,484, and a continuation of application No. 16/833,677, filed on Mar. 30, 2020, now Pat. No. 10,944,941, and a continuation of application No. 16/431,788, filed on Jun. 5, 2019, now Pat. No. 10,757,358, and a continuation of application No. 16/018,025, filed on Jun. 25, 2018, now Pat. No. 10,645,351, which is a continuation-in-part of application No. 15/854,697, filed on Dec. 26, 2017, now Pat. No. 10,499,019.

(51) Int. Cl.
*H04N 5/77* (2006.01)
*G11B 27/34* (2006.01)
*H04N 5/235* (2006.01)

(52) U.S. Cl.
CPC ............. *H04N 5/772* (2013.01); *G11B 27/34* (2013.01); *H04N 5/2353* (2013.01)

(58) Field of Classification Search
CPC .. H04N 5/77; H04N 5/23203; H04N 5/23229; H04N 5/23218; H04N 5/2353; H04N 5/23241; H04N 5/772; H04N 7/188; G11B 27/34
USPC ....... 386/224, 223, 227, 228, 239, 326, 328, 386/329
See application file for complete search history.

(56) References Cited

U.S. PATENT DOCUMENTS 6,388,773 B1 5/2002 Smith
7,634,662 B2 12/2009 Monroe
(Continued)

FOREIGN PATENT DOCUMENTS

CN 101146217 A 3/2008
CN 102695042 A 9/2012
(Continued)

*Primary Examiner* — Robert Chevalier
(74) *Attorney, Agent, or Firm* — Winston Hsu

(57) ABSTRACT

A motion detection method applied into an image sensor device includes: providing a plurality of regions of interest (ROIs) on at least one monitoring image; for each region of interest (ROI): detecting whether at least one motion event occurs within the each ROI; and determining a priority level of the each ROI according to at least one feature information of the at least one motion event; and determining an alarm schedule of the ROIs for a user according to a plurality of priority levels of the RIOs.

27 Claims, 23 Drawing Sheets

(56) References Cited

U.S. PATENT DOCUMENTS

| | | |
|---|---|---|
| 2004/0117638 A1 | 6/2004 | Monroe |
| 2014/0303435 A1 | 10/2014 | Taniguchi |
| 2015/0305114 A1 | 10/2015 | Hack |
| 2016/0104510 A1 | 4/2016 | Tamir |
| 2016/0110973 A1 | 4/2016 | Cho |
| 2016/0228987 A1 | 8/2016 | Baudimont |
| 2016/0277688 A1 | 9/2016 | Gaskamp |
| 2019/0146996 A1* | 5/2019 | Jang ................. H04N 7/183 707/758 |

FOREIGN PATENT DOCUMENTS

| | | |
|---|---|---|
| CN | 104079881 A | 10/2014 |
| CN | 206442461 U | 8/2017 |
| JP | 2004207786 A * | 7/2004 |

* cited by examiner

MOTION DETECTION METHODS AND IMAGE SENSOR DEVICES CAPABLE OF GENERATING RANKING LIST OF REGIONS OF INTEREST AND PRE-RECORDING MONITORING IMAGES

CROSS REFERENCE TO RELATED APPLICATIONS

This application is a continuation-in-part application of U.S. patent application Ser. No. 16/924,285 (filed on Jul. 9, 2020) and U.S. patent application Ser. No. 17/151,625 (filed on Jan. 18, 2021). U.S. patent application Ser. No. 16/924,285 is a continuation application of U.S. patent application Ser. No. 16/431,788 (filed on Jun. 5, 2019). U.S. patent application Ser. No. 17/151,625 is a continuation application of U.S. patent application Ser. No. 16/833,677 (filed on Mar. 30, 2020), which is a continuation application of U.S. patent application Ser. No. 16/018,025 (filed on Jun. 25, 2018), which is a continuation-in-part of U.S. patent application Ser. No. 15/854,697 (filed on Dec. 26, 2017). The disclosures of the prior applications are incorporated herein by reference herein in their entirety.

BACKGROUND OF THE INVENTION

1. Field of the Invention

The invention relates to a security monitoring scheme, and more particularly to a motion detection method and an image sensor device.

2. Description of the Prior Art

Referring to FIG. 1, it is a block diagram of a conventional video system including an image sensor 11 and a back end circuit 13. The image sensor 11 is used to monitor an environmental change and output a video compatible with the Full HD or higher resolution format to the back end circuit 13. The back end circuit 13 records the video and then performs the image analysis to tag image features in the recorded video.

Generally, the back end circuit 13 has higher power consumption. Nowadays, the power saving is an important issue such that the total power consumption of a system should be reduced as much as possible.

Accordingly, the present disclosure provides a smart photographing system that reduces the total power consumption by reducing data amount processed by a back end circuit thereof.

Please refer to FIG. 5. FIG. 5 is a monitoring system 50 in prior art. The monitoring system 50 includes a passive detector 52 and an image detection device 54 electrically connected to an external host 56. The passive detector 52 can transmit a triggering signal to the external host 26 while detecting temperature variation, the external host 56 wakes up by the triggering signal and then actuates the image detection device 54, and the image detection device 54 executes an exposure adjustment while being actuated and starts to capture a monitoring image or to record monitoring video. Thus, even though the passive detector 52 detects the temperature variation, the image detection device 54 captures the monitoring image at a later time in relation to a transmission period of the triggering signal, wakeup periods of the external host 16 and the image detection device 54, and an exposure adjustment period of the image detection device 54, so that the monitoring system 50 cannot record the monitoring video right after the passive detector 52 detects an unusual state.

SUMMARY OF THE INVENTION

Therefore one of the objectives of the invention is to provide an image sensor device and a motion detection method applied in the image sensor device, to solve the above-mentioned problems.

The present disclosure provides a photographing device including an image sensor, a first output interface, a second output interface and a processor. The image sensor is configured to capture a series of image data. The first output interface is coupled to the image sensor, and configured to output a first image frame, which corresponds to a first part of the series of image data and has a first size. The second output interface is coupled to the image sensor, and configured to output a second image frame, which corresponds to a second part of the series of image data and has a second size, to downstream of the photographing device. The processor is configured to receive the first image frame, control the image sensor to output the second image frame via the second output interface when identifying the first image frame containing a predetermined feature, and add a tag to the outputted second image frame.

The present disclosure further provides a photographing device including an image sensor, an output interface and a processor. The image sensor is configured to capture image data. The output interface is coupled to the image sensor, and configured to output an image frame corresponding to the image data to downstream of the photographing device. The processor is coupled to the output interface and configured to receive the image frame from the output interface, and add a tag associated with a predetermined feature to the image frame outputted to the downstream when identifying the image frame containing the predetermined feature.

The present disclosure further provides a photographing device including an image sensor, a first output interface and a second output interface. The image sensor is configured to capture image data of multiple pixels. The first output interface is coupled to the image sensor, and configured to output a first image frame, which corresponds to a part of the captured image data and has a first size. The second output interface is coupled to the image sensor, and configured to output a second image frame, which corresponds to the captured image data and has a second size, to downstream of the photographing device, wherein the second size is larger than the first size.

The feature tag of the present disclosure is referred to any tags instead of a time tag such as the moving object tag, ID tag, face tag, skin color tag, human shape tag, vehicle tag, license plate tag and so on. The tag is additional information added to pixel data of the second image frame.

Further, the present invention provides a motion detection device having capable of preventing false alarm of an infrared detector and having advantages of energy economy and immediate reaction for solving above drawbacks.

According to the claimed invention, a motion detection device is matched with a passive detector utilized to detect an object and to accordingly generate a triggering signal. The motion detection device includes an image capturing unit and an operating processor. The operating processor is electrically connected with the image capturing unit, the operating processor is adapted to switch the image capturing unit from a sleep mode to a wakeup mode for motion detection while being triggered by the triggering signal, and further to optionally actuate an external host in accordance with an analysis result of the motion detection.

According to the claimed invention, a motion detection method is applied to the motion detection device matched with a passive detector utilized to detect an object and to accordingly generate a triggering signal. The motion detection method includes receiving the triggering signal, switching an image capturing unit from a sleep mode to a wakeup mode for capturing a first monitoring image with low quality via the triggering signal, analyzing the first monitoring image to determine existence of the object, and actuating an external host in accordance with an analysis result of the first monitoring image.

According to the claimed invention, a motion detection device is matched with a passive detector utilized to detect an object and to accordingly generate a triggering signal. The motion detection device includes an image capturing unit and an operating processor. The operating processor is electrically connected with the image capturing unit, the operating processor is adapted to switch the image capturing unit from a sleep mode to a wakeup mode for motion detection while being triggered by the triggering signal. The image capturing unit operates in a low frame rate to determine an exposure parameter of the image capturing unit but not stores monitoring images to a memory while in the sleep mode, and operates in a high frame rate to determine existence of the object and stores the monitoring images to the memory while in the wakeup mode.

According to the claimed invention, a motion detection device is matched with a passive detector utilized to detect an object and to accordingly generate a triggering signal. The motion detection device includes an image capturing unit and an operating processor. The operating processor is electrically connected with the image capturing unit, the operating processor is adapted to switch the image capturing unit from a sleep mode to a wakeup mode for motion detection while being triggered by the triggering signal. The image capturing unit captures and stores a plurality of monitoring images in a memory in the wakeup mode, and when the operating processor determines existence of the object through the stored monitoring images then the image capturing unit is switched to a recording mode to record monitoring video.

The motion detection device of the present invention is electrically connected between the passive detector and the external host, and the motion detection device is utilized to actuate the external host while the passive detector triggers the motion detection device switched from the sleep mode to the wakeup mode. As the motion detection device is in the sleep mode, the motion detection device can be awaken in the low frame rate to adjust the exposure parameter and to capture the background image; as the motion detection device is switched to the wakeup mode, the motion detection device is transformed into the high frame rate to capture the low quality monitoring image. The motion detection device executes the simple image analysis via the low quality monitoring image for a start for determining whether to actuate the external host; since the motion detection device actuates the external host, the motion detection device captures and stores the high quality monitoring image, and the high quality monitoring image can be used by the external host for the accurate image analysis and execution of related application programs. The motion detection device of the present invention can effectively economize start-up time of the monitoring system without waiting for a wakeup period of the external host and an exposure adjustment period of the motion detection device.

Further, the present invention provides a smart motion detection device without losing images before wakeup of a processor and a related determining method for solving above drawbacks.

According to the claimed invention, a smart motion detection device includes a memory, a processor having a sleep mode and a wakeup mode, and a sensor array directly coupled to the memory and further electrically connected with the processor. An image captured by the sensor array is processed by the processor. The sensor array is adapted to pre-store the image into the memory when the processor is operated in the sleep mode, and the pre-stored image is received by the processor in the wakeup mode. The sensor array includes a comparator adapted to generate an alarm signal for switching the processor from the sleep mode to the wakeup mode in accordance with a comparison result of the pre-stored image.

According to the claimed invention, the smart motion detection device further includes a passive sensor electrically connected with the processor and the sensor array, and adapted to output an alarm signal for driving the sensor array to pre-store the image into the memory and switching the processor from the sleep mode to the wakeup mode. In addition, the sensor array can include a comparator adapted to compare the pre-stored image with a reference image, and the sensor array pre-stores the image into the memory when intensity variation between the pre-stored image and the reference image is greater than a predefined value.

According to the claimed invention, a smart motion detection device is capable of receiving an alarm signal to monitor motion of an object. The smart motion detection device includes a sensor array, a memory and a processor. The sensor array is adapted to capture images at a first time after receiving with the alarm signal. The memory is directly coupled to the sensor array and adapted to pre-store the captured images. The processor is coupled to the sensor array and adapted to process the captured images through the memory at a second time after receiving with the alarm signal. The second time is later than the first time.

According to the claimed invention, a determining method is applied to a smart motion detection device having a memory, a sensor array, and a processor coupled to the memory and the sensor array. The determining method includes the processor analyzing images captured by the sensor array when the sensor array is activated to capture the images, and the processor analyzing images pre-stored inside the memory when the sensor array is not activated. The processor is enabled by an alarm signal.

According to the claimed invention, the smart motion detection device includes a memory, a processor and a sensor array. The processor has a sleep mode and a wakeup mode. The sensor array is directly coupled to the memory and further electrically connected with the processor, and a plurality of images captured by the sensor array is processed by the processor. Images captured by the sensor array when the processor is operated in the sleep mode are pre-stored into the memory, and images captured by the sensor array when the processor is operated in the wakeup mode are transmitted to the processor.

According to the claimed invention, the smart motion detection device includes a memory, a processor and a sensor array. The sensor array is directly coupled to the memory and further electrically connected with the processor. The sensor array and the processor are turned off under a non-working mode. When the smart motion detection device receives a trigger signal, the sensor array directly captures and sends images to the memory before the processor sends a request to the sensor array for receiving the captured images.

The alarm signal may be generated by the sensor array or the passive sensor. The alarm signal is utilized to activate pre-storing operation of the sensor array and mode switching operation of the processor. When the alarm signal is received, the sensor array can be activated to capture the pre-stored image at a first time and the pre-stored image is transmitted to the memory. For waiting the duration of the processor switched from the sleep mode to the wakeup mode, the processor which receives the alarm signal can send a request to the sensor array for the real-time image and the pre-stored image at a second time later than the first time, so that the pre-stored image from the memory are processed later than the first time, and the real-time image is not stored into the memory but directly transmitted to the processor for the digital processing. The smart motion detection device and the related determining method of the present invention can effectively economize start-up time of the smart motion detection device without waiting for a wakeup period of the processor.

According to embodiments of the invention, a motion detection method applied into an image sensor device is further disclosed. The method comprises: providing a plurality of regions of interest (ROIs) on at least one monitoring image; for each region of interest (ROI): detecting whether at least one motion event occurs within the each ROI; and determining a priority level of the each ROI according to at least one feature information of the at least one motion event; and determining an alarm schedule of the ROIs for a user according to a plurality of priority levels of the RIOs.

According to the embodiments, a motion detection method applied into an image sensor device is further disclosed. The method comprises: when detecting a first motion event within a first region of interest (ROI) on a first monitoring image generated from the image sensor device, generating a first feature information of the first motion event and a first timestamp; searching a system storage, electrically coupled to another different image sensor device, according to the first feature information and the first timestamp, to obtain a second motion event within a second ROI on a second monitoring image generated from the another different image sensor device; and using an identification information of the second motion event as an identification information of the first motion event to combine the second motion event with the first motion event.

According to the embodiments, an image sensor device is further disclosed. The device comprises a sensing circuit and a processing circuit. The sensing circuit is used for generating at least one monitoring image and providing a plurality of regions of interest (ROIs) on the at least one monitoring image. The processing circuit is coupled to the sensing circuit. For each region of interest (ROI), the processing circuit is arranged for detecting whether at least one motion event occurs within the each ROI, for determining a priority level of the each ROI according to at least one feature information of the at least one motion event, and for determining an alarm schedule of the ROIs for a user according to a plurality of priority levels of the RIOs.

According to the embodiments, an image sensor device is further disclosed. The device comprises a sensing circuit and a processing circuit. The sensing circuit is used for sensing a first monitoring image. The processing circuit is coupled to the sensing circuit, and it is arranged for: detecting a first motion event within a first region of interest (ROI) on the first monitoring image generated from the sensing circuit; generating a first feature information of the first motion event and a first timestamp; searching a system storage, electrically coupled to another different image sensor device, according to the first feature information and the first timestamp, to obtain a second motion event within a second ROI on a second monitoring image generated from the another different image sensor device; and using an identification information of the second motion event as an identification information of the first motion event to combine the second motion event with the first motion event.

These and other objectives of the present invention will no doubt become obvious to those of ordinary skill in the art after reading the following detailed description of the preferred embodiment that is illustrated in the various figures and drawings.

DETAILED DESCRIPTION

It should be noted that, wherever possible, the same reference numbers will be used throughout the drawings to refer to the same or like parts.

The present disclosure is applicable to an image processing system that transmits captured image frames to a back end circuit for post-processing. The image processing system is, for example, a security monitoring system.

One objective of the present disclosure is to reduce loading of the backed thereby reducing total power consumption of the system. The back end is arranged to record a plurality of images (or referred to a video) outputted by a photographing device, and a video interval desired to be watched in playing the video on a screen is selected by selecting the recorded feature tag to realize a smart photographing system.

Figure 1:
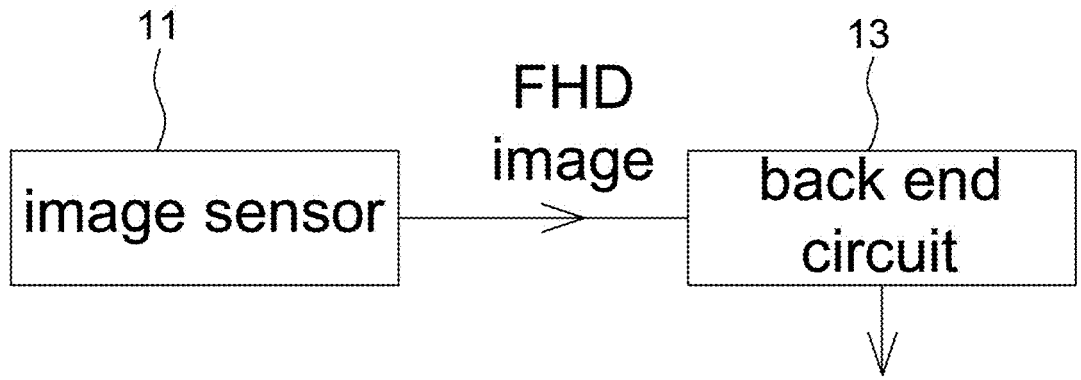
FIG. 1 is a block diagram of a conventional video system.
Figure 2:
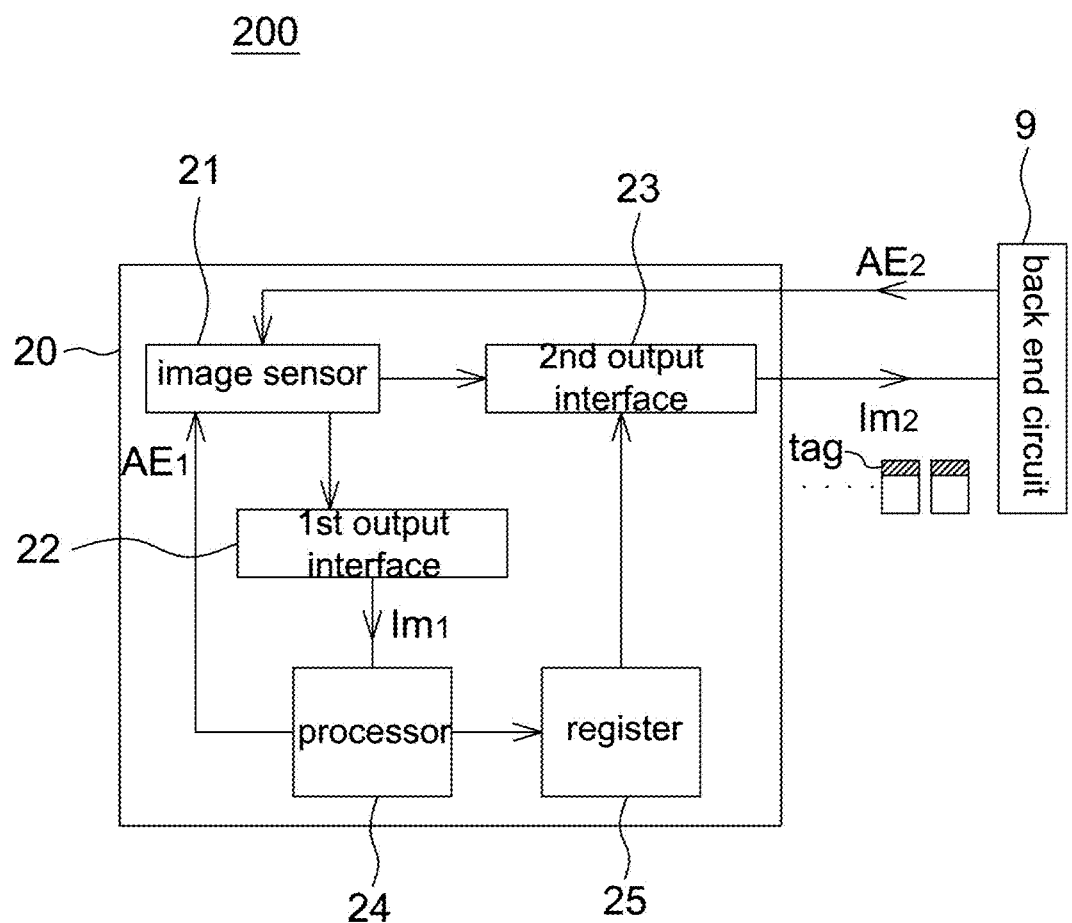
FIG. 2 is a block diagram of a photographing system according to one embodiment of the present disclosure.

Referring to FIG. 2, it is a block diagram of a smart photographing system 200 according to one embodiment of the present disclosure, including a photographing device 20 and a back end circuit 9 coupled to each other, wherein the back end circuit 9 has the function of image recording (e.g., in a memory) and playing (e.g., via a screen). The back end circuit 9 is, for example, a computer system such as a notebook computer, a tablet computer, a desktop computer or a central monitoring system. According to different applications, the back end circuit 9 has different play modes such as fast-forward, backward and selecting video time interval. In some embodiments, the photographing system 200 records environmental sound, and the back end circuit 9 has the function of playing audio data.

The photographing device 20 and the back end circuit 9 are arranged as a single device, or arranged as two separated devices coupled to each other in a wired or wireless manner without particular limitations. The back end circuit 9 is, for example, in a remote central server out of the photographing device 20.

The photographing device 20 is, for example, a sensor chip formed as an IC package, and has pins for communicating with external electronic devices. The photographing device 20 includes an image sensor 21, a first output interface 22, a second output interface 23 and a processor 24.

The first output interface 22 is coupled to the processor 24, and outputs first image frames Im1 having a first size to the processor 24 for the image recognition and analysis. The second output interface 23 is coupled to a back end circuit 9 out of the photographing device 20 via the pin (not shown in figure), or by a wired or wireless connection, and outputs second image frames Im2 having a second size to the back end circuit 9, e.g., via a signal transmission line, a bus line and/or wireless channel.

In one non-limiting embodiment, the first size is preferably much smaller than the second size. For example, the second size is compatible with the full HD format or higher formats for recording the video suitable to be watched by users; and the first size is compatible with the SD format or lower formats to reduce data amount processed by the processor 24.

The image sensor 21 is, for example, a CCD image sensor, a CMOS image sensor or other optical sensors for converting light energy to electrical signals. The image sensor 21 includes a plurality of pixels for generating image data within every frame period to the first output interface 22 or the second output interface 23. For example, the image sensor 21 includes a pixel array for generating the image data, and has a sampling circuit (e.g., CDS circuit) for sampling the image data from every pixel. The sampled image data is then converted into digital data by an analog to digital converter (ADC) to form the first image frame Im1 or the second image frame Im2.

The image sensor 21 captures a series of image data, corresponding to successive image frame, at a predetermined frame rate. The first image frame corresponds to a first part of the series of image data, and the second image frame corresponds to a second part of the series of image data. The first and second parts of the series of image data correspond to image data of a same image frame or different image frames.

To cause the first image frame Im1 to be smaller than the second image frame Im2, in one aspect the first image frame Im1 is acquired within the frame period by turning off a part of pixels of the pixel array of the image sensor 21, i.e. the first image frame Im1 containing the image data outputted by a part of pixels of the pixel array. In another aspect, the first image frame is generated by downsampling the image data outputted by the image sensor 21, but not limited thereto. Other techniques suitable to reduce the size of image frames outputted by an image sensor are also applicable to the present disclosure.

The processor 24 is, for example, an application specific integrated circuit (ASIC) or a digital signal processor (DSP), and used to receive a first image frame Im1 to identify whether the first image frame Im1 includes a predetermined feature. For example, when the first image frame Im1 contains a moving object (e.g., by comparing multiple image frames), the first image frame Im1 is identified to contain the predetermined feature, but not limited to. The processor 24 identifies a face, a human shape, a predetermined identification (ID), a predetermined vehicle, a predetermined license plate, skin color and so on (e.g., using the machine learning or comparing with pre-stored features) to indicate that the first image frame Im1 contains the predetermined feature. When the first image frame Im contains the predetermined feature, the processor 24 informs the image sensor 21 to output successive image frames (or video), i.e. the second image Im2 herein, to the back end circuit 9 for the image recording.

Figure 3:
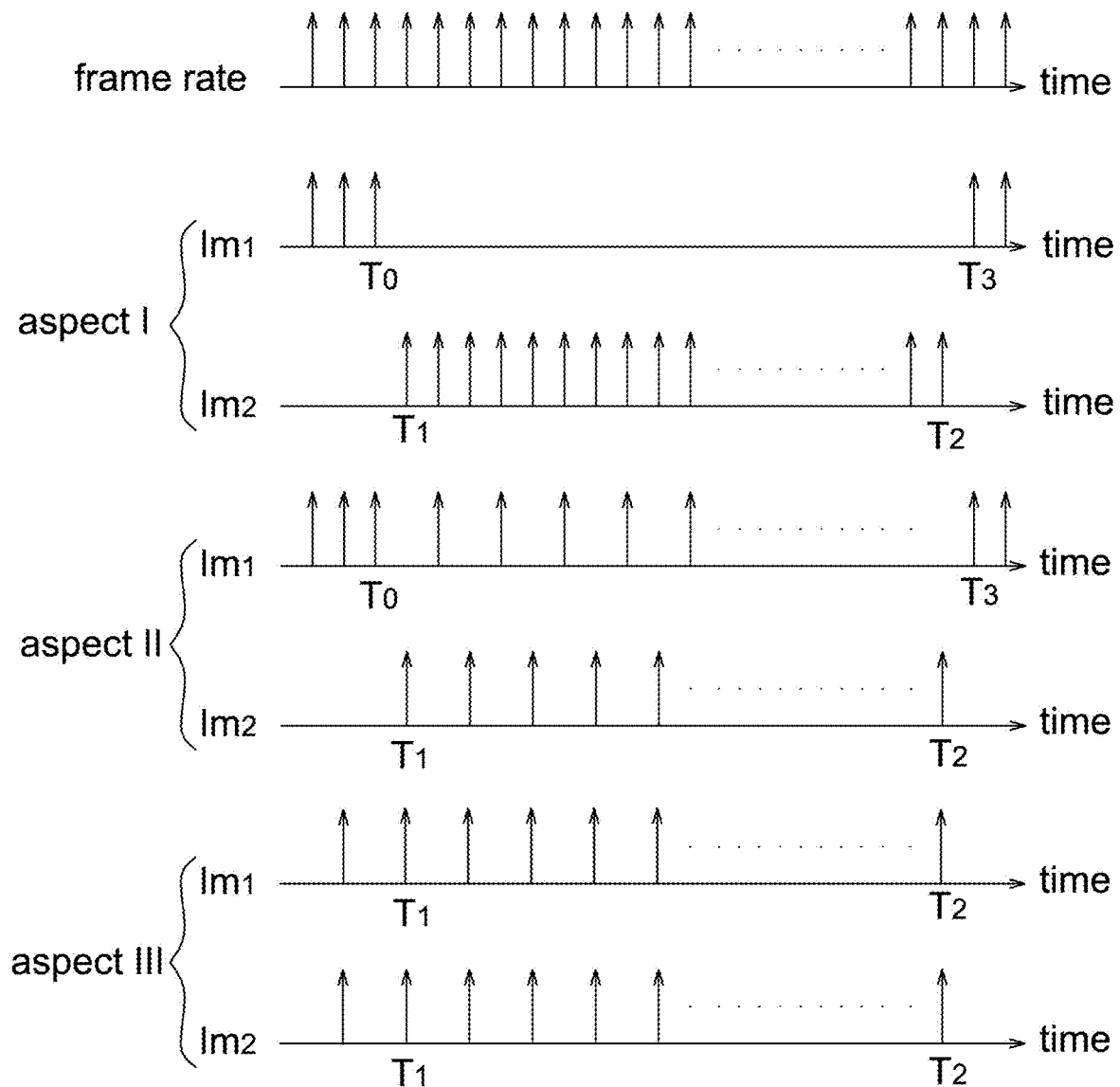
FIG. 3 is an operational schematic diagram of a photographing device according to one embodiment of the present disclosure.

Referring to FIG. 3, it is a schematic diagram of several operational aspects of the photographing device 20 according to some embodiments of the present disclosure. In FIG. 3, each arrow symbol indicates one image frame. The first row in FIG. 3 indicates image frames generated by the image sensor 21, and each arrow symbol in FIG. 3 indicates image data of one image frame is captured.

In an aspect I, when identifying that the first image frame Im1 (e.g., image frame at time T0) contains a predetermined feature, the processor 24 controls the image sensor 21 to continuously (i.e. not outputting the first image frame Im1) output second image frames Im2 for a predetermined interval (e.g., a time interval between T1 and T2), and adds a tag associated with the predetermined feature on every second image frame Im2 outputted within the predetermined interval.

The tag is included, for example, within the data header of the every second image frame Im2, e.g., showing by the region filled with slant lines in FIG. 2. The tag may be different corresponding to different image features. For example, the tag contains at least one of a moving object tag, an ID tag, a face tag, a skin color tag, a human shape tag, a vehicle tag and a license plate tag, but not limited thereto. The processor 24 adds one or more than one tags to the second image frame Im2 according to different predetermined features using, for example, a register 25 to change a digital value, wherein the processor 24 is arranged to tag predetermined types of different features, and a number of said types is determined according to different applications and the processing ability of the processor 24.

More specifically in the aspect I, before the processor 24 identifies that the first image frame Im1 contains the predetermined feature, the image sensor 21 does not output any second image frame Im2 to the back end circuit 9 via the second output interface 23. When the processor 24 identifies that the first image frame Im1 contains the predetermined feature, it means that the photographed environment has information desired to be recorded such that a recording mode (e.g., between T1 and T2) is entered. In the recording mode, the back end circuit 9 records both image data and tagged data of the second image frame Im2. Within the predetermined interval between T1 and T2, the image sensor 21 does not output the first image frame Im1 via the first output interface 22. To further reduce the power consumption, the processor 24 is shut down or enters a sleep mode in the recording mode.

Within the predetermined interval between T1 and T2, to normally perform an auto exposure operation, the image sensor 21 further receives an auto exposure control signal AE2 from the back end circuit 9, wherein AE2 is generated by a processor (e.g., a CPU or MCU) of the back end circuit 9 by identifying, for example, brightness of the second image frame Im2. Meanwhile, as the processor 24 is in sleeping or shut down status, the processor 24 does not output an auto exposure control signal AE1 (e.g., generated by the processor 24 by identifying brightness of the first image frame Im1) to the image sensor 21. The auto exposure control signal AE1 is sent to the image sensor 21 before the recording mode is entered.

When the predetermined interval is over at T2, the image sensor 21 outputs (e.g., automatically or controlled by the processor 24) the first image frame Im1 (e.g., image frame at time T3) to the processor 24 via the first output interface 22 again. The processor 24 identifies whether the first image frames Im1 after time T3 (including T3) contain the predetermined feature or not, and stops outputting the second image frame Im2 to downstream of the photographing device 20 via the second output interface 23. When the processor 24 further identifies one first image frame Im1 after time T3 contains the predetermined feature, the recording mode is entered again; and since the operation from recognizing the predetermined feature and entering the recording mode have been illustrated above, details thereof are not repeated herein.

In a non-limiting aspect, the first output interface 22 outputs the first image frame Im1 to the processor 24 from time to time (predetermined) within the predetermined interval T0-T2. If the processor 24 continuously identifies the predetermined feature or another new predetermined feature within the predetermined interval T0-T2, the processor 24 automatically extends the predetermined interval T0-T2. More specifically, the predetermined interval T0-T2 is extendable depending on whether any predetermined feature exists in the first image frame Im1 within the predetermined interval T0-T2.

In an aspect II, when identifying that the first image frame Im1 (e.g., image frame at time T0) contains a predetermined feature, the processor 24 controls the image sensor 21 to alternatively output a second image frame Im2 (e.g., image frame at time T1) via the second output interface 23 and output a first image frame Im1 via the first output interface 22, and adds at least one tag, which is illustrated above and thus details thereof are not repeated herein, associated with the predetermined feature to the second image frame Im.

More specifically in the aspect II, before the processor 24 identifies that the first image frame Im1 contains the predetermined feature, the image sensor 21 does not output any second image frame Im2 to downstream of the photographing device 20 via the second output interface 23. After entering a recording mode (e.g., time interval between T1 and T2), the processor 24 receives the first image frame Im1 with a lower frequency (e.g., a half shown in FIG. 3, but not limited thereto), and identifies whether every received first image frame Im1 contains a predetermined feature, but the frame rate of the image sensor 21 is not changed. That is, when identifying that any first image frame Im1 contains the predetermined feature, the processor 24 controls the image sensor 21 to output at least one (e.g., one being shown in FIG. 3, but not limited to) second image frame Im2 via the second output interface 23 to the back end circuit 9 and tags the outputted second image frame Im2, wherein the tag is determined according to a first image frame Im1 prior to the outputted second image frame Im. When identifying that the predetermined feature disappears from the first image frame Im1 (e.g., image frame at time T3), the processor 24 controls the image sensor 21 to output the first image frame Im1 via the first output interface 22 but not output the second image frame Im2 via the second output interface 23.

In the aspect II, within the recording mode (e.g., between T1 and T2), as the processor 24 is continuously in operation, the image sensor 21 performs the auto exposure according to the auto exposure control signal AE1 from the processor 24 or according to the auto exposure control signal AE2 from the back end circuit 9 without particular limitations.

More specifically, in the first and second aspects, as the first image frame Im1 and the second image frame Im2 are used for different purposes, the image sensor 21 does not output image frames via the first output interface 22 and the second output interface 23 simultaneously. When the first image frame Im1 does not contain a predetermined feature, the photographing system 200 just continuously identifies the predetermined feature in the first image frames Im1 but does not record images, e.g., the back end circuit 9 being turned off. When the first image frame Im1 contains the predetermined feature, second image frames Im2 are outputted continuously or separated by at least one first image frame Im1 for the back end circuit 9 to the image recording as shown in FIG. 3.

However in an aspect III, the first output interface 22 and the second output interface 23 output a first image frame Im1 and a second image frame Im2 in parallel, e.g., the first image frame Im1 and the second image frame Im2 being retrieved from the image data of the same image frame. The processor 24 identifies whether the first image frame Im1 contains a predetermined image feature. If the first image frame Im1 is identified containing the predetermined feature, the second output interface 23 outputs the second image frame Im2 with at least one tag. On the contrary, if the first image frame Im1 is identified not containing the predetermined feature, the second output interface 23 does not outputs the second image frame Im2 out of the photographing device 200.

In some embodiments, the smart photographing system 200 of the present disclosure further includes a passive infrared radiation (PIR) sensor. In this case, the processor 24 identifies whether to output the second image frame Im2 via the second output interface 23 to the back end circuit 9 for the image recording according to output results of both the PIR sensor and the image sensor 21 (e.g., one of them detecting a moving object or human body). The operation is similar to the above embodiments only the processor 24 further receiving the detected result from the PIR sensor to accordingly identify a human body, and thus details thereof are not illustrated herein.

Figure 4:
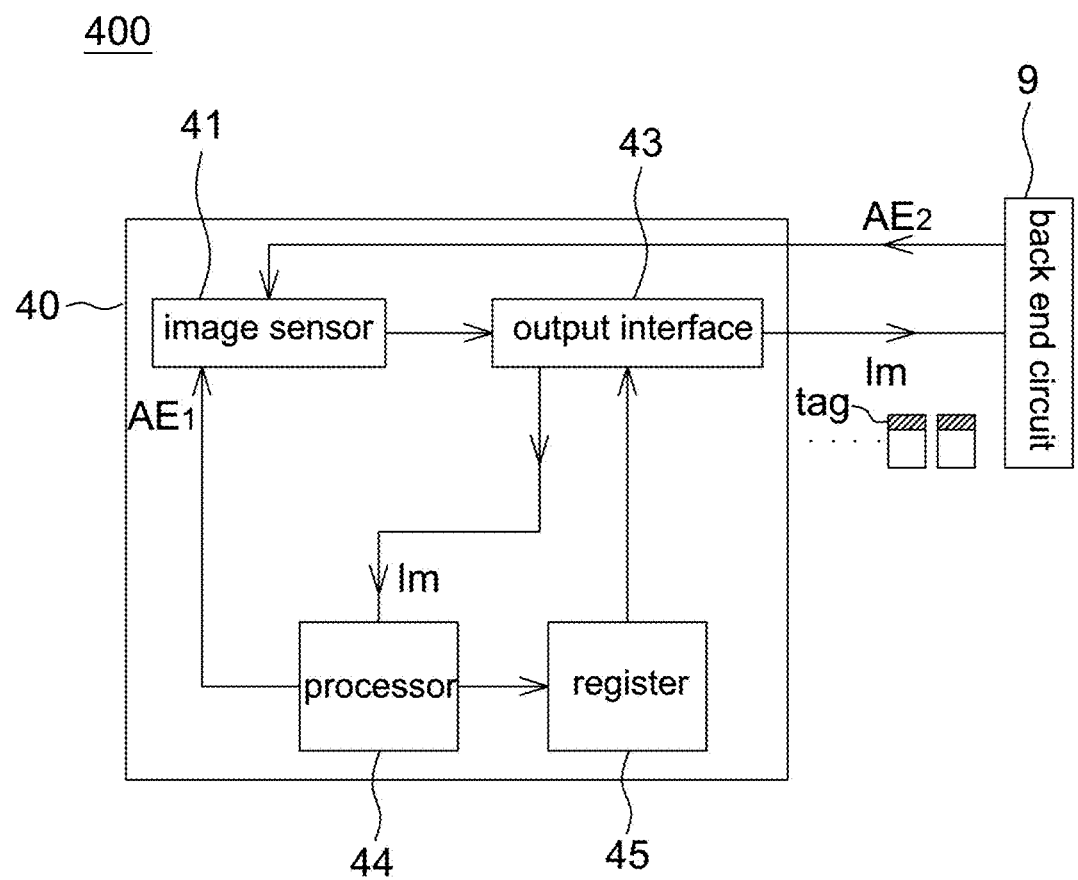
FIG. 4 is a block diagram of a photographing system according to another embodiment of the present disclosure.
Figure 5:
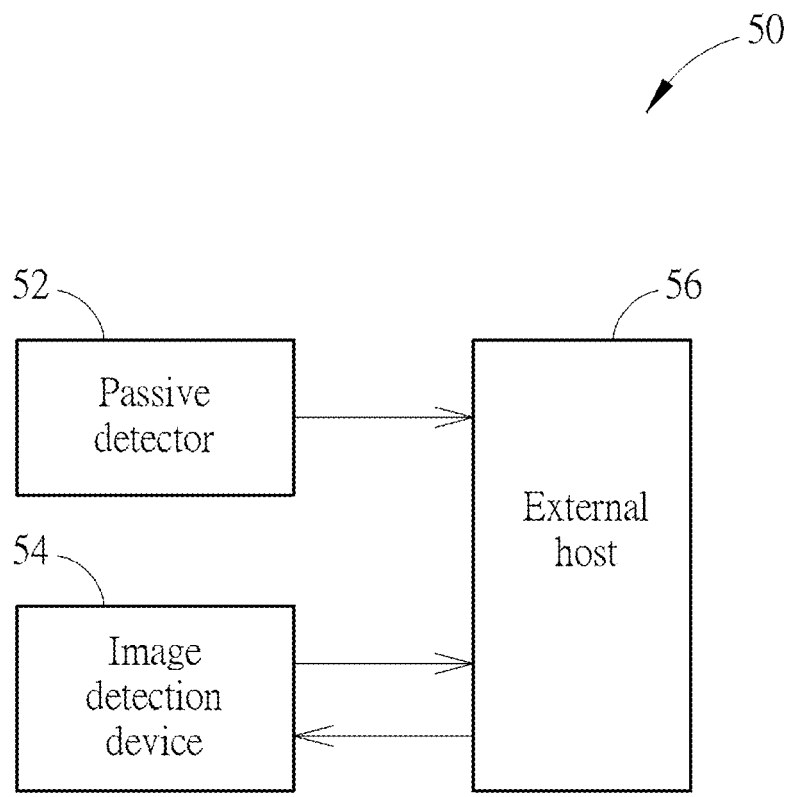
FIG. 5 is a monitoring system 50 in prior art.

Referring to FIG. 4, it is a schematic diagram of a photographing device 400 according to another embodiment of the present disclosure. The photographing device 400 includes one output interface 43 for outputting an image frame to both the downstream circuit and the processor 44. The processor 44 identifies whether the image frame Im contains a predetermined feature. If the image frame Im is identified containing the predetermined feature, the output interface 43 outputs the image frame with at least one tag associated with the predetermined feature to the back end circuit 9; whereas, if the mage frame Im is identified not containing the predetermined feature, the output interface 43 does not output the image frame Im to the back end circuit 9. That is, the output of the image frame Im to the back end circuit 9 waits for the identifying process performed by the processor 24.

The operation of this embodiment also implemented using FIG. 3, e.g., Im1 shown in FIG. 3 is replaced by Im2. More specifically, the difference between FIG. 4 and FIG. 2 is that in FIG. 4, a single output interface 43 outputs the same image sensor Im to two directions, and this operation is implemented by switching devices or multiplexer.

In the present disclosure, an auto exposure control signal is used to control, for example, an exposure interval of the image sensor 21, light source intensity and a gain value to change average brightness of the image frame generated by the image sensor 21 to be within a suitable range.

In other embodiments, the tag indicates a simple analyzed result of the first image frame Im1, e.g., indicating the first image frame Im1 containing a face, human skin color, a human shape object or a vehicle. The processor of the back end circuit 9 has stronger calculation ability, and said processor performs the operation requiring more calculation such as performing the ID recognition or license plate recognition according to the second image frame Im2.

As mentioned above, in the conventional security monitoring system, a back end circuit performs both the image recording and the feature tagging, and the image sensor outputs image frames having only one size to the back end circuit for the image recording. Accordingly, the present disclosure further provides a photographing device generating image frames of two sizes (e.g. referring to FIG. 2) that recognizes a triggering object in a low resolution image frame at first and then outputs a tagged high resolution image frame to an external back end circuit for the image recording. As the recorded successive images have already contained the feature tag in the data packet, the back end circuit needs not to perform the feature tag anymore.

Figure 6:
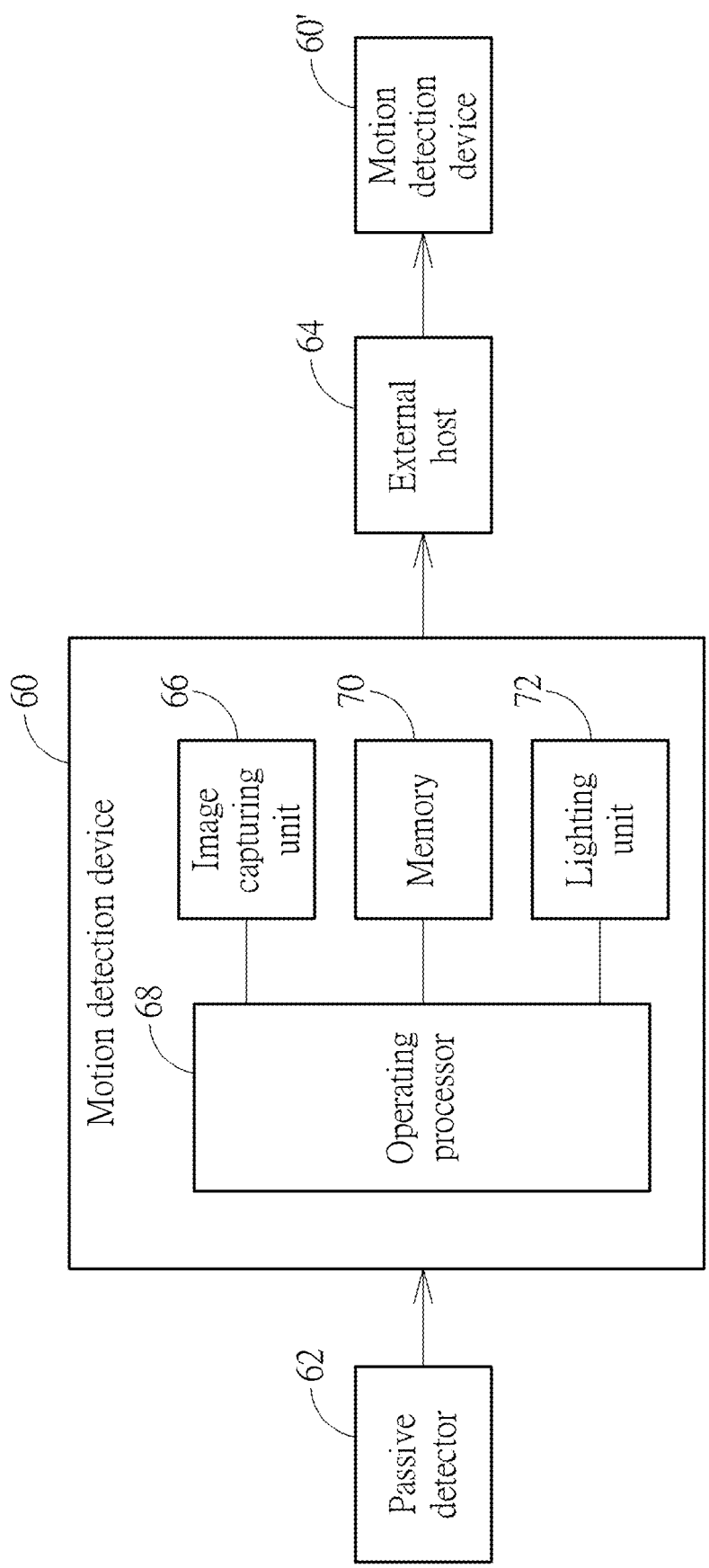
FIG. 6 is a block diagram of a motion detection device according to an embodiment of the present invention.

Please refer to FIG. 6. FIG. 6 is a block diagram of a motion detection device 60 according to an embodiment of the present invention. The motion detection device 60 can be matched with a passive detector 62 and an external host 64 to provide preferred smart motion detecting function. The motion detection device 60 is electrically connected between the passive detector 62 and the external host 64. The passive detector 62 is used to detect if a specific situation happened, such as a living thing passed by or a door opened, so as to trigger the motion detection device 60 to analyze if a true event of the specific situation existed, which means the living thing detected by the passive detector 62 is identified as an expected object. When the true event is determined, the motion detection device 60 transmits related data for the external host 64 to determine a security alarm.

In one embodiment, the passive detector 62 can be a temperature detector, such as an infrared detector, and the motion detection device 60 can be selectively operated in a sleep mode or a wakeup mode. While a monitoring region is in an usual state, the passive detector 62 does not detect temperature variation, the motion detection device 60 stays in a sleep mode; while in an unusual state that the specific situation happens (such like the living thing passed by), the passive detector 62 detects the temperature variation and generates a triggering signal to switch the motion detection device 60 from the sleep mode to a wakeup mode.

The motion detection device 60 can include an image capturing unit 66, an operating processor 68, a memory 70 and a lighting unit 72. The operating processor 68 can drive the image capturing unit 66 to alternatively switch between the sleep mode and the wakeup mode, and further can drive the image capturing unit 66 to optionally capture monitoring images with low quality and high quality. In one embodiment, the lighting unit 72 can be actuated only while the image capturing unit 66 captures image, so as to enhance the image capturing unit 66 capturing images in a power efficiency manner.

The image capturing unit 66 may capture a background monitoring image with a low frame rate in the sleep mode, and capture a plurality of monitoring images with a high frame rate in the wakeup mode. The background image could be captured in low quality, wherein the background image is used for auto-exposure control of the image capturing unit 66. The monitoring images could comprise a first monitoring image with the low quality and a second monitoring image with the high quality, wherein the first monitoring image is used for the operating processor 68 to identify if the true event is happened and the second monitoring image is used for the external host 64 to determine the security alarm. The monitoring images captured by the image capturing unit 66 can be stored inside the memory 70, and further the high quality monitoring image can be transmitted to the external host 64.

In this embodiment, the monitoring system utilizes the passive detector 62 to detect the object passing through the monitoring region for a start, and then utilizes the motion detection device 60 to analyze whether the passed object conforms to a predetermined condition (i.e., true event). As a view range of the passive detector 62 has passerby and the specific situation is identified, the motion detection device 60 is switched to the wakeup mode by the passive detector 62 and determines whether the passerby is the expected object (which means the human); if so, the motion detection device 60 actuates the external host 64, and the external host 64 identifies the object within the monitoring images to optionally drive the motion detection device 60 in a recording mode, to send out a warning, to shut down the motion detection device 60 and to awaken another motion detection device 60' electrically connected with the external host 64.

Figure 7:
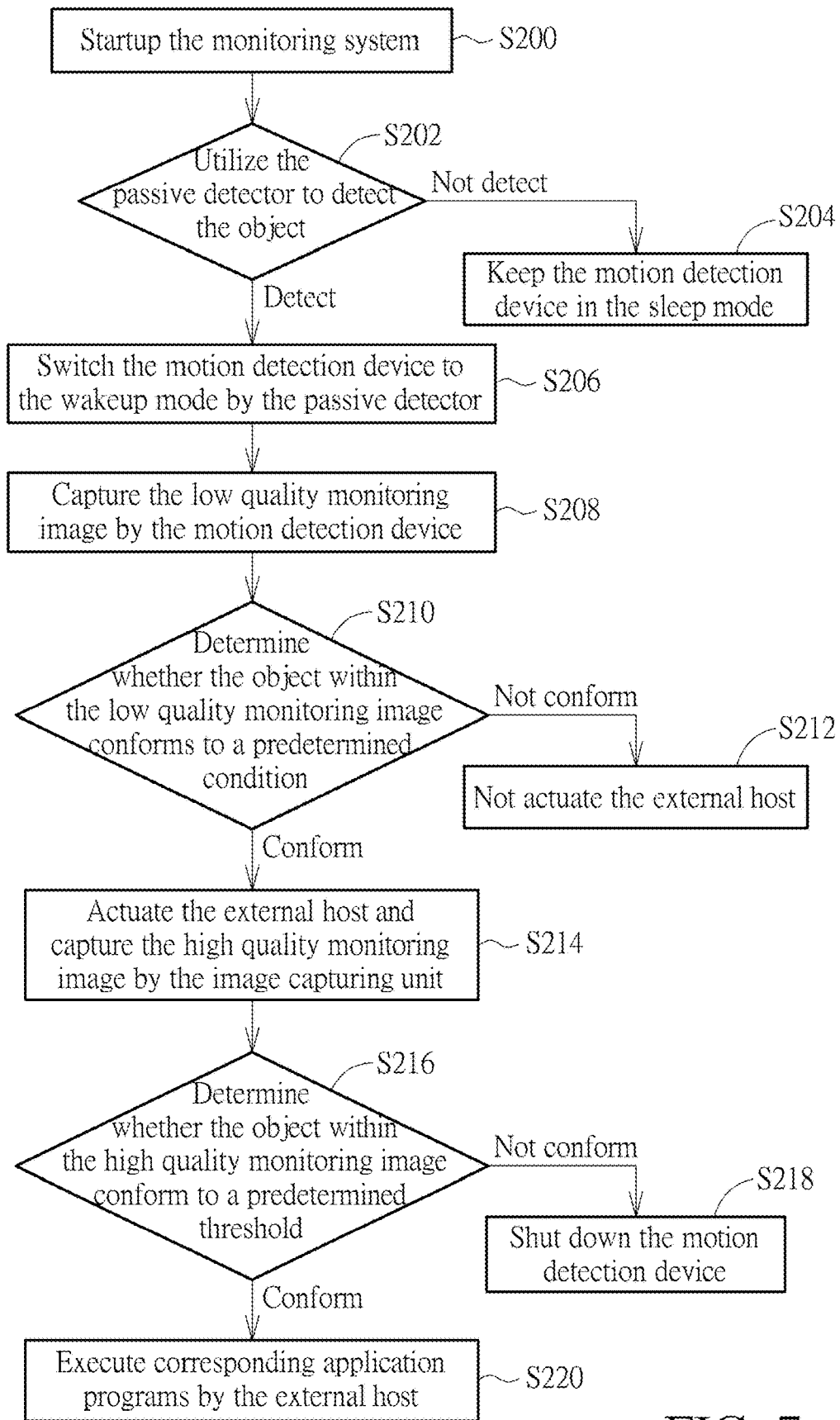
FIG. 7 is a flow chart of a motion detection method applied to the motion detection device according to the embodiment of the present invention.

Please refer to FIG. 7. FIG. 7 is a flow chart of a motion detection method applied to the motion detection device 60 according to the embodiment of the present invention. First, step S200 and S202 are executed to startup the monitoring system, and the passive detector 62 is utilized to detect the object within the view range. If the passive detector 62 does not detect the temperature variation, step S204 is executed to keep the image capturing unit 66 in the sleep mode; if the passive detector 62 detects the temperature variation, step S206 is executed that the passive detector 62 transmits the triggering signal to switch the image capturing unit 66 from the sleep mode to the wakeup mode. Then, step S208 and step S210 are executed, the lighting unit 72 can be actuated in accordance with surrounding illumination and the image capturing unit 66 captures the first monitoring image (with the low quality), the operating processor 68 simply analyzes the first monitoring image for determining whether to actuate the external host 64.

In one embodiment, the image capturing unit 66 captures the low quality monitoring image by using partial pixels, such as to divide the pixel array into a plurality of 2×2 pixel blocks and to use only one pixel in each pixel block to capture the image. In another embodiment, the image capturing unit 66 captures image by all pixels and divides all pixels to several pixel block (such as 2×2 pixel block) so as to combine values in all pixels in each pixel block as a block value and generates the low quality monitoring image by those block values.

In step S210, the operating processor 68 preferably analyzes a specific region of interest (ROI) within the first monitoring image to determine actuation of the external host 64, dimensions of the specific region is smaller than the first monitoring image, so that the operating processor 68 can rapidly acquire an image analysis result due to less data calculation in ROI; the first monitoring image setting as a low quality monitoring image is helpful to speed up image analysis about the specific region of interest. Position and dimensions of ROI are preferably pre-defined by the user, for example, a door and a window are situated in the first monitoring image, ROI can cover the pattern of the door to avoid the analysis result from being interfered by left shadow on the window, or ROI can cover edges of window for detecting a thief climbing into the window and also preventing the analysis result from being interfered by the left shadow; the position and dimensions of ROI further may be varied according to the analysis result. However, the operating processor 68 may analyze an entire region within the first monitoring image to perform the step S210, which depends on design demand. The said image analysis can be executed by identifying a pattern contour within the monitoring image, comparing feature point on the monitoring image, and analyzing intensity variation of the monitoring image optionally.

As the object does not conform to the predetermined condition, suck like the passerby within the monitoring image being the animal instead of the human, step S212 is executed to not actuate the external host 64, and the image capturing unit 66 may be passively or actively shut down to back the sleep mode. As the object conforms to the predetermined condition, which means the passerby within the monitoring image may be an unauthorized person, step S214 is executed to actuate the external host 64 and the image capturing unit 66 starts to capture the second monitoring image with the high quality, and the second monitoring image can be captured as static images format or a continuing video format and can be stored inside the memory 70. Next, step S216 is executed that the external host 64 receives the second monitoring image and utilizes image recognition algorithm to precisely analyze the object within the second monitoring image.

The second monitoring image does not conform to a predetermined threshold, which means the object is not the unauthorized person, step S218 is executed to shut down the motion detection device 60 passively or actively for energy economy; the second monitoring image conforms to the predetermined threshold, hence the object is defined as the unauthorized person, step S220 is executed that the external host 64 can switch the motion detection device 60 into the recording mode, the motion detection device 60 transmits the monitoring video outwardly for backup, and the other motion detection devices 60' can be simultaneously awaken for overall monitoring. Therefore, the passive detector 62 cannot directly actuate the external host 64 while detecting the object, the motion detection device 60 wakes up by trigger of the passive detector 62 to capture the first monitoring image, and the external host 64 is actuated in accordance with the low quality image analysis of the first monitoring image through the motion detection device 60.

The motion detection device 60 can begin to capture the second monitoring image while the external host 64 is actuated. The external host 64 has to spend a period of time on waking other motion detection devices, the second monitoring image can record any doubtful event inside the monitoring region before the other motion detection devices are awaken, which means the monitoring system does not miss the doubtful event in a term between a detection timing of the passive detector 62 and a wakeup timing of the other motion detection devices. The first monitoring image with the low quality is used by the motion detection device 60 to determine existence of the object, the existence determination is rough computation and may be affected by noise, and the second monitoring image with the high quality is used by the external host 64 to analyze the accurate motion detection of the object, such as face recognition.

Figure 8:
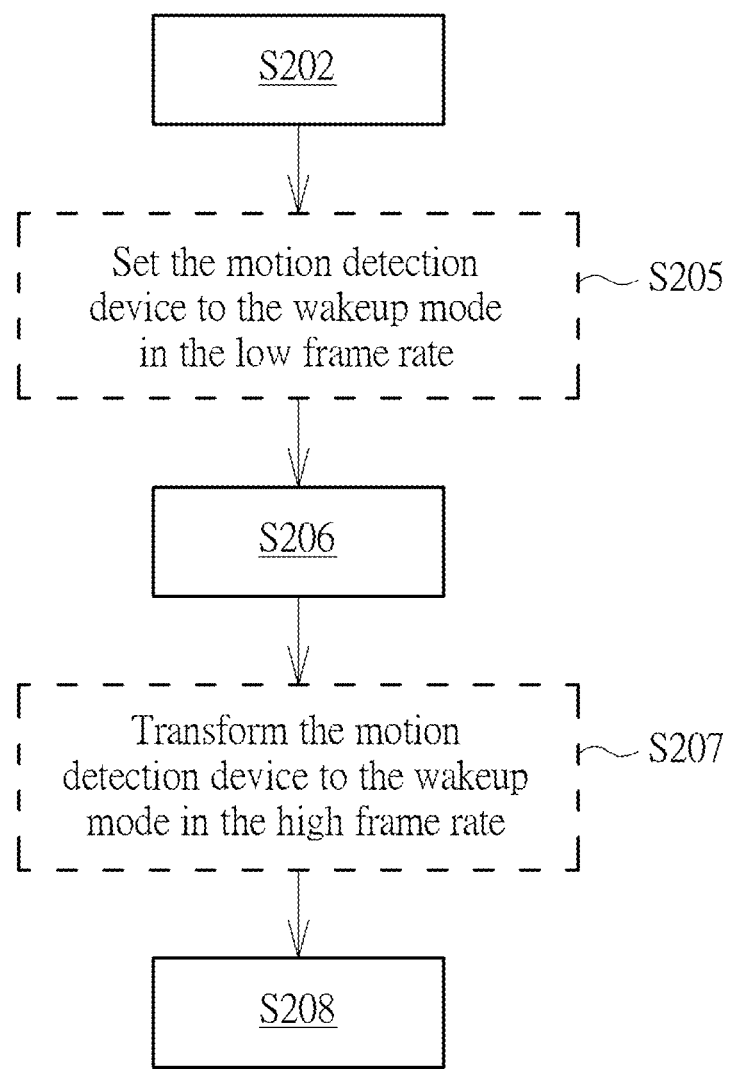
FIG. 8 is a flow chart of a motion detection method applied to the motion detection device according to the embodiment of the present invention.
Figure 9:
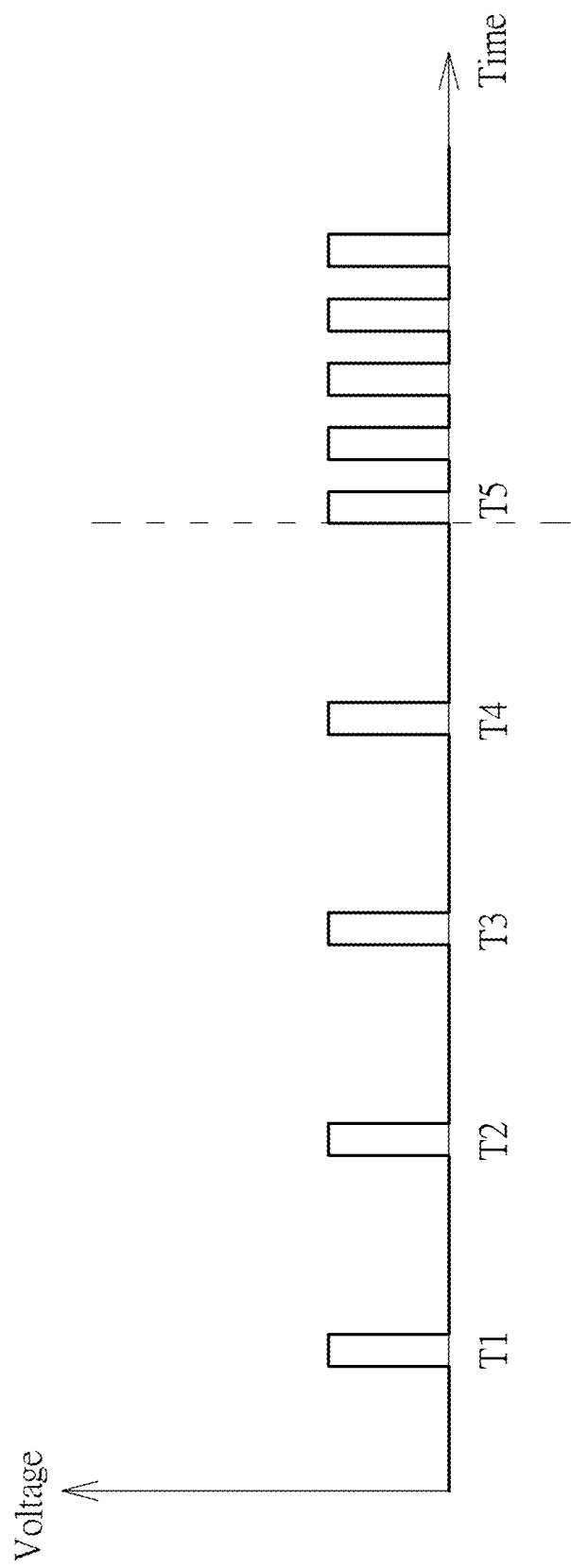
FIG. 9 is a waveform diagram of a frame rate executed by an image capturing unit according to the embodiment of the present invention.

The present invention further provides an exposure adjustment function for preferred operational efficiency of the motion detection device 60. Please refer to FIG. 8 and FIG. 9. FIG. 8 is a flow chart of a motion detection method applied to the motion detection device 60 according to another embodiment of the present invention. FIG. 9 is a waveform diagram of a frame rate executed by the image capturing unit 66 according to the foresaid embodiment of the present invention. In the embodiment, steps having the same numeral as one of the above-mentioned embodiment have the same content, and a detailed description is omitted herein for simplicity. As the motion detection device 60 is not awaken by the passive detector 62, step S205 can be executed to periodically switch the image capturing unit 66 to the wakeup mode in the low frame rate, and the image capturing unit 66 in the wakeup mode can execute the exposure adjustment and capture a low quality background image. As the motion detection device 60 is awaken, step S207 is executed to transform the image capturing unit 66 into the wakeup mode in the high frame rate, and later, the image capturing unit 66 still captures the monitoring image with the low quality to compare with the background image for determining actuation of the external host 64.

For example, as shown in FIG. 9, the image capturing unit 66 may execute the exposure adjustment and capture the background image one frame per second (1 fps) while the motion detection device 60 is not triggered by the passive detector 62, which means an exposure parameter of the image capturing unit 66 can be adjusted and the background image can be established at timing T1, T2, T3 and T4. While the passive detector 62 triggers the motion detection device 60 into the wakeup mode at timing T5, the motion detection device 60 may capture the first monitoring images thirty frames per second (30 fps), the latest background image (captured at the timing T4) has the exposure parameter similar to ones of the first monitoring image captured at the timing T5, so that the image capturing unit 66 in the wakeup mode is not in need of the exposure adjustment, and can immediately acquire the superior monitoring image with suitable exposure parameters.

In conclusion, the motion detection device of the present invention is electrically connected between the passive detector and the external host, and the motion detection device is utilized to actuate the external host while the passive detector triggers the motion detection device switched from the sleep mode to the wakeup mode. As the motion detection device is in the sleep mode, the motion detection device can be awaken in the low frame rate or stay in the sleep mode to adjust the exposure parameter and to capture the background image; as the motion detection device is switched to the wakeup mode, the motion detection device is transformed into the high frame rate to capture the low quality monitoring image. The motion detection device executes the simple image analysis via ROI of the low quality monitoring image for a start for determining whether to actuate the external host; since the motion detection device actuates the external host, the motion detection device captures and stores the high quality monitoring image, and the high quality monitoring image can be used by the external host for the accurate image analysis and execution of related application programs. The motion detection device of the present invention can effectively economize start-up time of the monitoring system without waiting for a wakeup period of the external host and an exposure adjustment period of the motion detection device.

Figure 10:
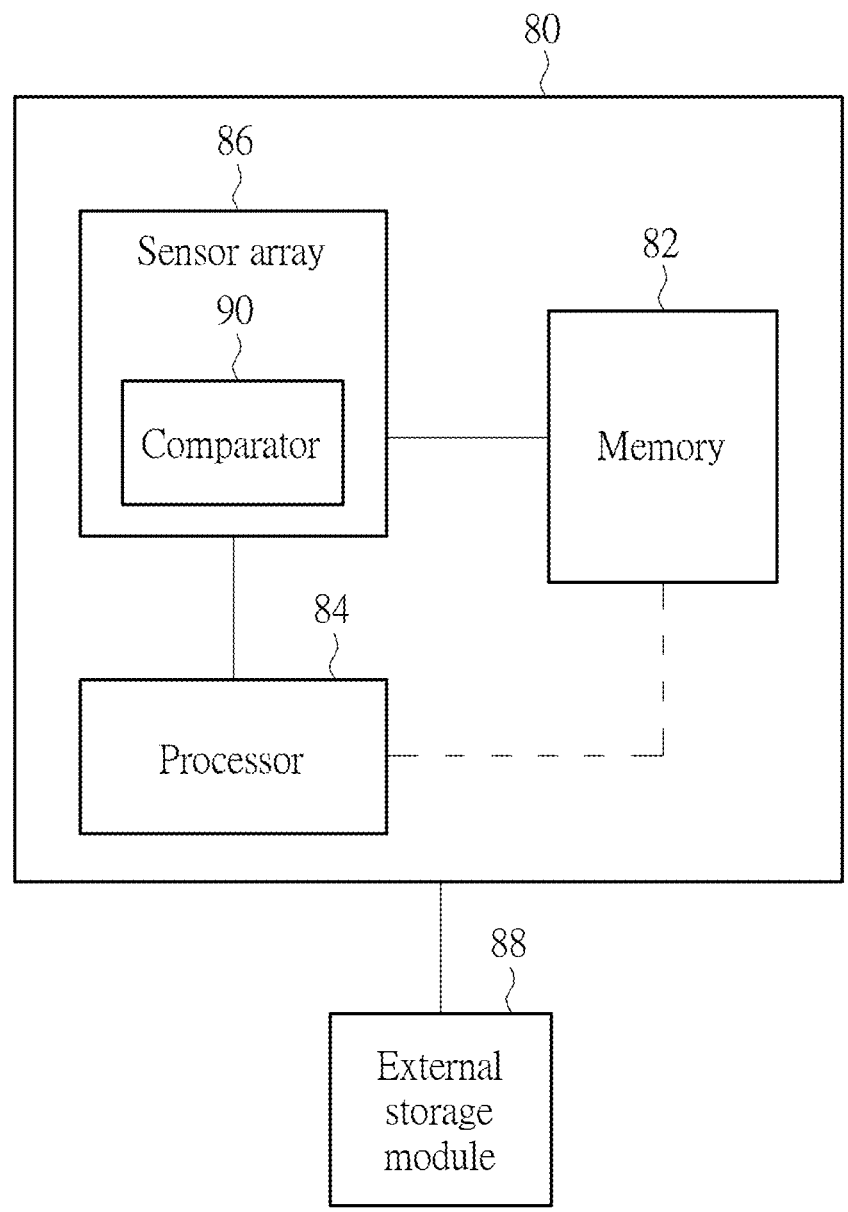
FIG. 10 is a functional block diagram of a smart motion detection device according to a first embodiment of the present invention.
Figure 11:
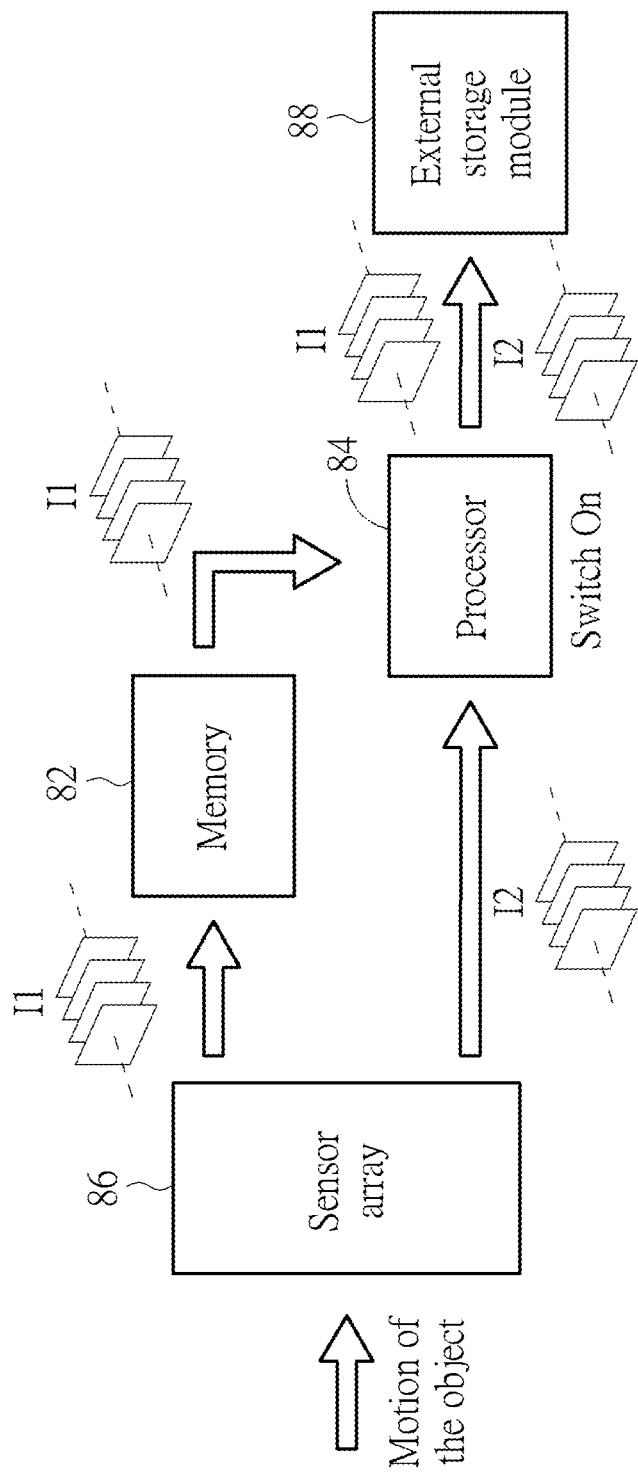
FIG. 11 is a procedural diagram of the smart motion detection device according to the first embodiment of the present invention.

Please refer to FIG. 10 and FIG. 11. FIG. 10 is a functional block diagram of a smart motion detection device 80 according to a first embodiment of the present invention. FIG. 11 is a procedural diagram of the smart motion detection device 80 according to the first embodiment of the present invention. The smart motion detection device 80 can include a memory 82, a processor 84 and a sensor array 86, which are three separate components or combined as one or two integrated components. The sensor array 86 can be directly coupled to the memory 82 and further electrically connected with the processor 84. The sensor array 86 includes a plurality of light detecting pixels arranged in two-dimension manner to capture images. The processor 84 can be switched between a sleep mode and a wakeup mode, and used to process an image captured by the sensor array 86 to identify a particular event in the captured images, such as an unexpected object been captured in the captured images.

The image captured by the sensor array 86 may be pre-stored (i.e., wrote) into the memory 82 or directly transmitted to the processor 84 in accordance with modes of the processor 84 or an alarm signal resulted from motion detection. The memory 82 can have the image capacity of predefined quantity; when the memory 82 is full and a new image is prepared to pre-store, a former image can be removed for storing the new image. The image processed by the processor 84 and the pre-stored image in the memory 82 can be transmitted to an external storage module 88 electrically connected with the smart motion detection device 80.

As the first embodiment shown in FIG. 11, the processor 84 stays in the sleep mode when the smart motion detection device 80 is not activated. The sensor array 86 can include a comparator 90 adapted to generate the alarm signal when monitoring motion of an object. As the processor 84 is operated in the sleep mode, the sensor array 86 continuously or intermittently captures a plurality of images (such as capture five images in every 1 second), and the plurality of images are pre-stored into the memory 82; in the meantime, the comparator 90 reads and compares at least some of the pre-stored images I1 with a reference image. When intensity variation between one of the pre-stored images I1 and the reference image is smaller than a predefined value, the processor 84 keeps in the sleep mode and the comparator 90 reads the next pre-stored image I1 for a comparison with the reference image. When the intensity variation is greater than the predefined value, the comparator 90 can generate the alarm signal utilized to awake the processor 84 and further to pre-store the image captured by the sensor array 86 into the memory 82. That is, the alarm signal is used to switch the processor 84 from the sleep mode to the wakeup mode.

There has variety ways for the comparator 90 to compare the pre-stored images I1 and the reference image, for example the comparator 90 could compare whole image range or only compare partial pixels for the pre-stored images I1 and the reference image. The comparator 90 could compare intensity summation of all pixels or partial pixels, in another way the comparator 90 could compare intensity of each pixel in whole image range or only partial pixels.

When the processor 84 is operated in the wakeup mode, a real-time image I2 captured by the sensor array 86 is directly transmitted to the processor 84 for digital processing and may not be stored into the memory 82. The processor 84 in the wakeup mode may process the real-time image I2 and receive the pre-stored image I1 in the memory 82 by turns, or may receive the pre-stored image I1 after processing of the real-time image I2. A process of the real-time image I2 can precede that of the pre-stored image I1, so the smart motion detection device 80 is able to focus on an instant situation within the monitoring area. The process of the pre-stored image I1 may be executed when the process of the real-time image I2 is completed or paused. If an operating capability of the processor 84 is sufficient for mass data, the real-time image I2 and the pre-stored image I1 can be processed alternately, hence the smart motion detection device 80 can show detection results about the current and previous period at the same time.

In some embodiments, the pre-stored images captured by the sensor array 86 when the processor 84 is operated in the sleep mode can be pre-stored into the memory 82, and the real-time images captured by the sensor array 86 when the processor 84 is operated in the wakeup mode can be transmitted to the processor 84. In other embodiments, the processor 84 and the sensor array 86 can be turned off under a non-working mode; when the smart motion detection device 80 receives a trigger signal, the sensor array 86 can capture and send the images to the memory 82 directly, and then the processor 84 can send a request to the sensor array 86 for receiving the captured images. The trigger signal may be an alarm resulted from an external unit or a built-in unit of the smart motion detection device 80.

In addition, at least one of an image quality and a frame rate of the sensor array 86 may be changed when the processor 84 is operated in the sleep mode or the wakeup mode. For example, as the processor 84 is in the sleep mode, the sensor array 86 can capture the low-quality image or capture the image in the low frame rate for comparing with the reference image. Transmission bandwidth and storage capability are economized accordingly. The alarm signal is generated because the intensity variation between the low-quality image (or the image captured in the low frame rate) and the reference image is greater than the predefined value, so that the sensor array 86 starts to capture the high-quality image or capture the image in the high frame rate for pre-storing into the memory 82, and simultaneously the processor 84 can be switched to the wakeup mode. Then, the pre-stored high-quality image or the pre-stored image captured in the high frame rate in the memory 82 is transmitted to the processor 84 operated in the wakeup mode; therefore the smart motion detection device 80 does not lose image information before the processor 84 is in the wakeup mode.

Figure 12:
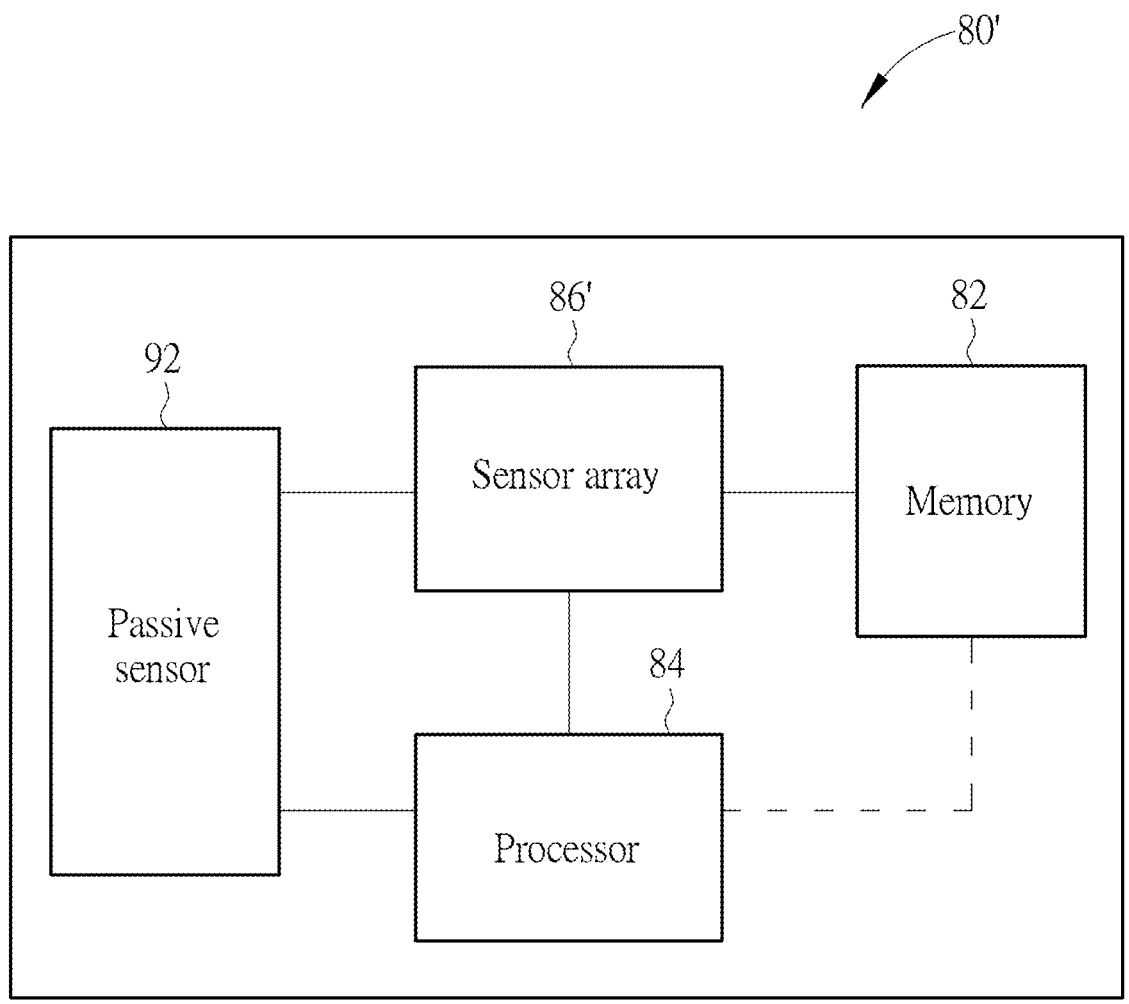
FIG. 12 is a functional diagram of the smart motion detection device according to a second embodiment of the present invention.
Figure 13:
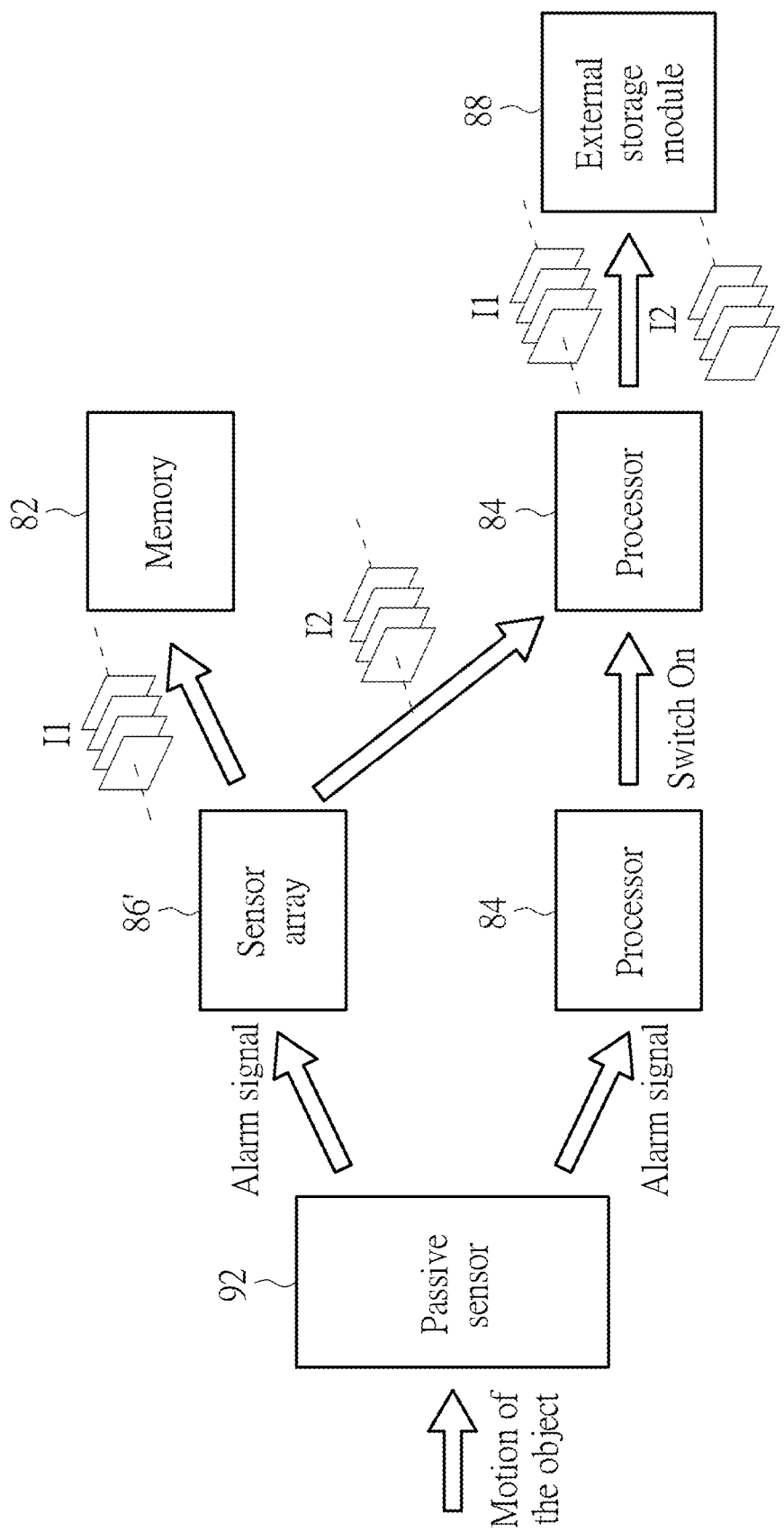
FIG. 13 is a procedural diagram of the smart motion detection device according to the second embodiment of the present invention.
Figure 14:
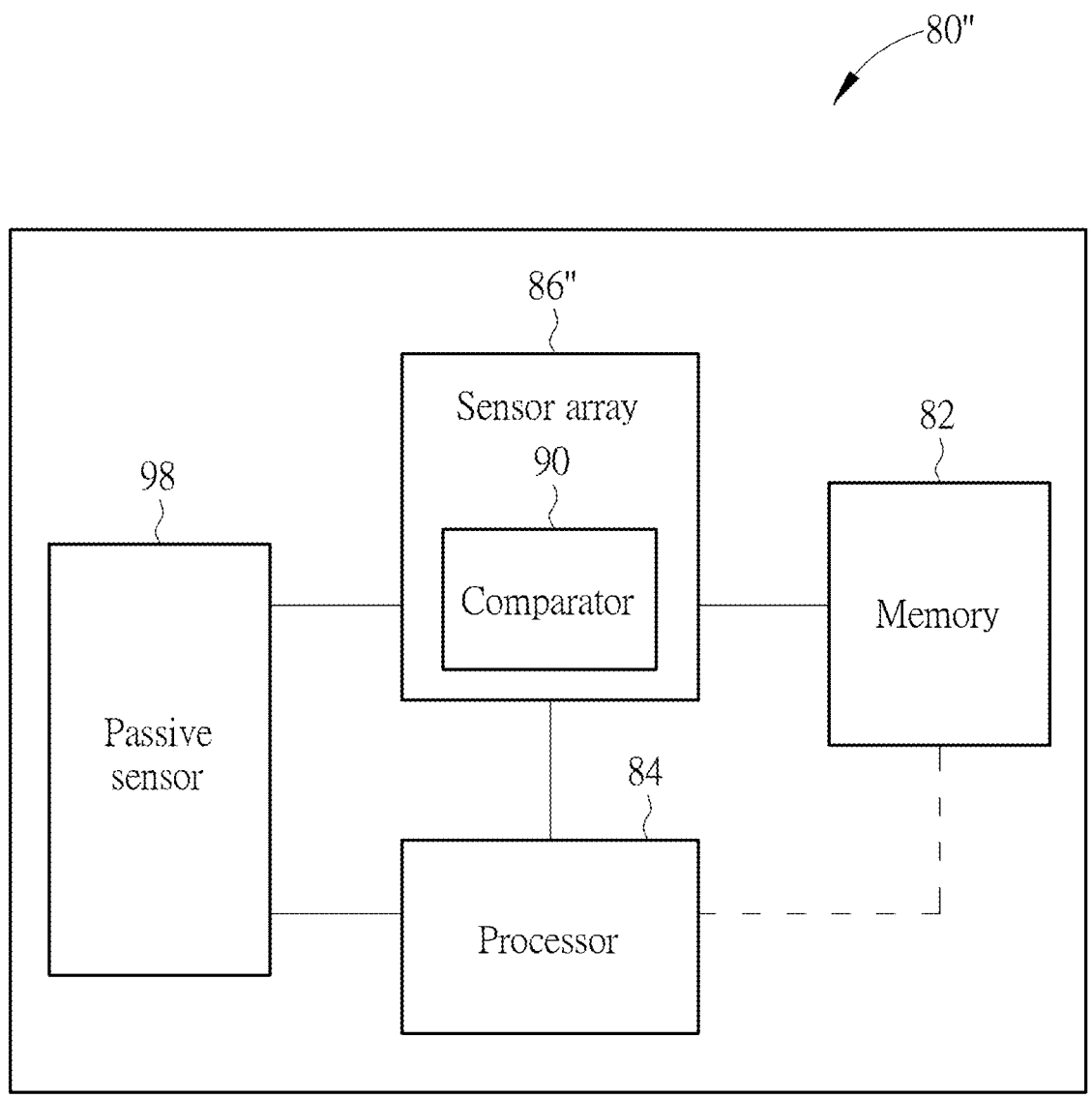
FIG. 14 is a functional diagram of the smart motion detection device according to a third embodiment of the present invention.
Figure 15:
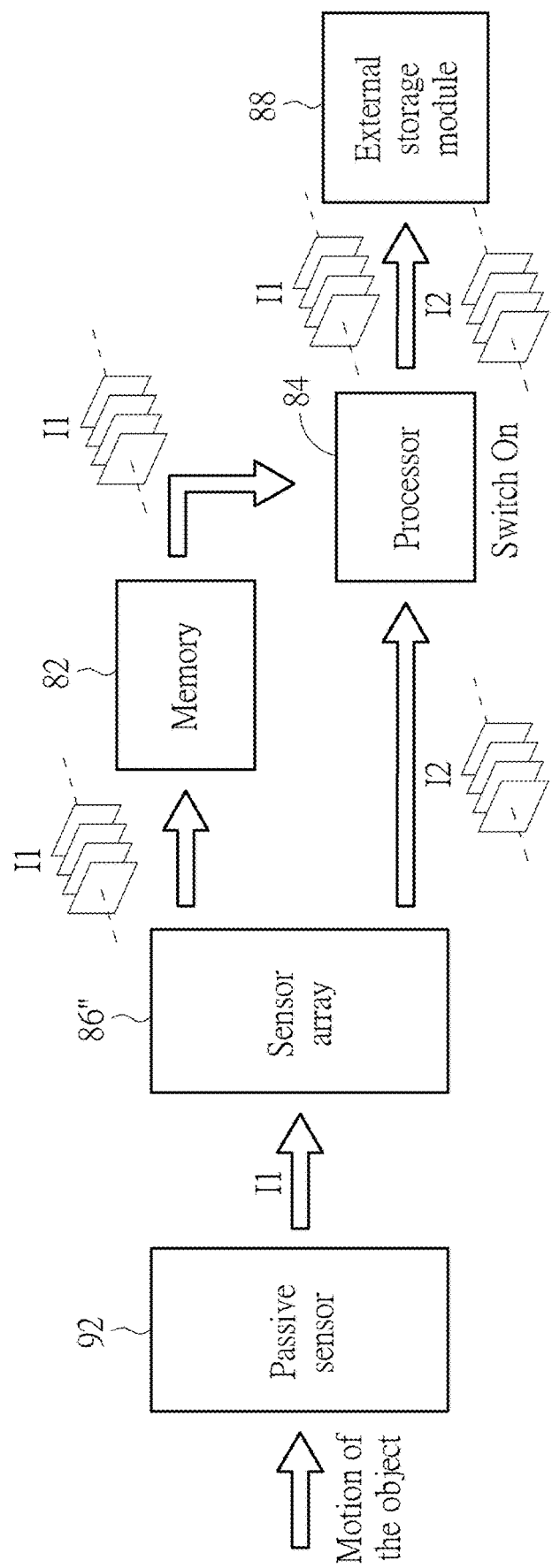
FIG. 15 is a procedural diagram of the smart motion detection device according to the third embodiment of the present invention.

Please refer to FIG. 12 to FIG. 15. FIG. 12 is a functional diagram of the smart motion detection device 80' according to a second embodiment of the present invention. FIG. 13 is a procedural diagram of the smart motion detection device 80' according to the second embodiment of the present invention. FIG. 14 is a functional diagram of the smart motion detection device 80" according to a third embodiment of the present invention. FIG. 15 is a procedural diagram of the smart motion detection device 80" according to the third embodiment of the present invention. In the embodiments, elements having the same numerals as ones of the first embodiment have the same functions, and a detailed description is omitted herein for simplicity.

In a possible embodiment, the smart motion detection device 80' can include the memory 82, the processor 84, the sensor array 86' and a passive sensor 92. The passive sensor 92 is electrically connected with the processor 84 and the sensor array 86'. The processor 84 is kept in the sleep mode and the sensor array 86' is shut down when the passive sensor 92 does not detect any abnormal situation. As the passive sensor 92 detects the motion of the object, the passive sensor 92 can generate the alarm signal, and the alarm signal is used to drive the sensor array 86' and switch the processor 84 from the sleep mode to the wakeup mode. When the processor 84 is still in the sleep mode, the sensor array 86' can capture and transmit the pre-stored image I1 to the memory 82. When the processor 84 is operated in the wakeup mode, the sensor array 86' can capture and transmit the real-time image I2 to the processor 84, and the pre-stored image I1 in the memory 82 can be transmitted to the processor 84 accordingly.

The smart motion detection device 80 may have the non-working mode. The processor 84 and the sensor array 86' can be turned off under the non-working mode. As the passive sensor 92 detects the motion of the object and generates the alarm signal, the sensor array 86' is triggered by the alarm signal and starts to capture and send the pre-stored image into the memory 82. After that, the processor 84 can be switched to the wakeup mode and then sends the request to the sensor array 86' for receiving the pre-stored image.

In another possible embodiment, the smart motion detection device 80" can include the memory 82, the processor 84, the sensor array 86" having the comparator 90, and the passive sensor 92. The passive sensor 92 can activate the sensor array 86" when detecting the abnormal situation. The activated sensor array 86" can capture and transmit the pre-stored image I1 to the memory 82, and the comparator 90 can compare the pre-stored image I1 with the reference image for determining whether to switch on the processor 84. The comparator 90 is utilized to identify the abnormal situation. If the intensity variation between the pre-stored image I1 and the reference image is smaller than the predefined value, the abnormal situation may be resulted from noise and the processor 84 is not switched on. If the intensity variation is greater than the predefined value, the abnormal situation can be defined as someone or something intruding into the monitoring area of the smart motion detection device, so that the processor 84 is switched to the wakeup mode for recording. As the processor 84 is operated in the wakeup mode, the real-time image I2 captured by the sensor array 86" and the pre-stored image I1 in the memory 82 can be transmitted to the processor 84 and then to the external storage module 88 for the digital processing.

Figure 16:
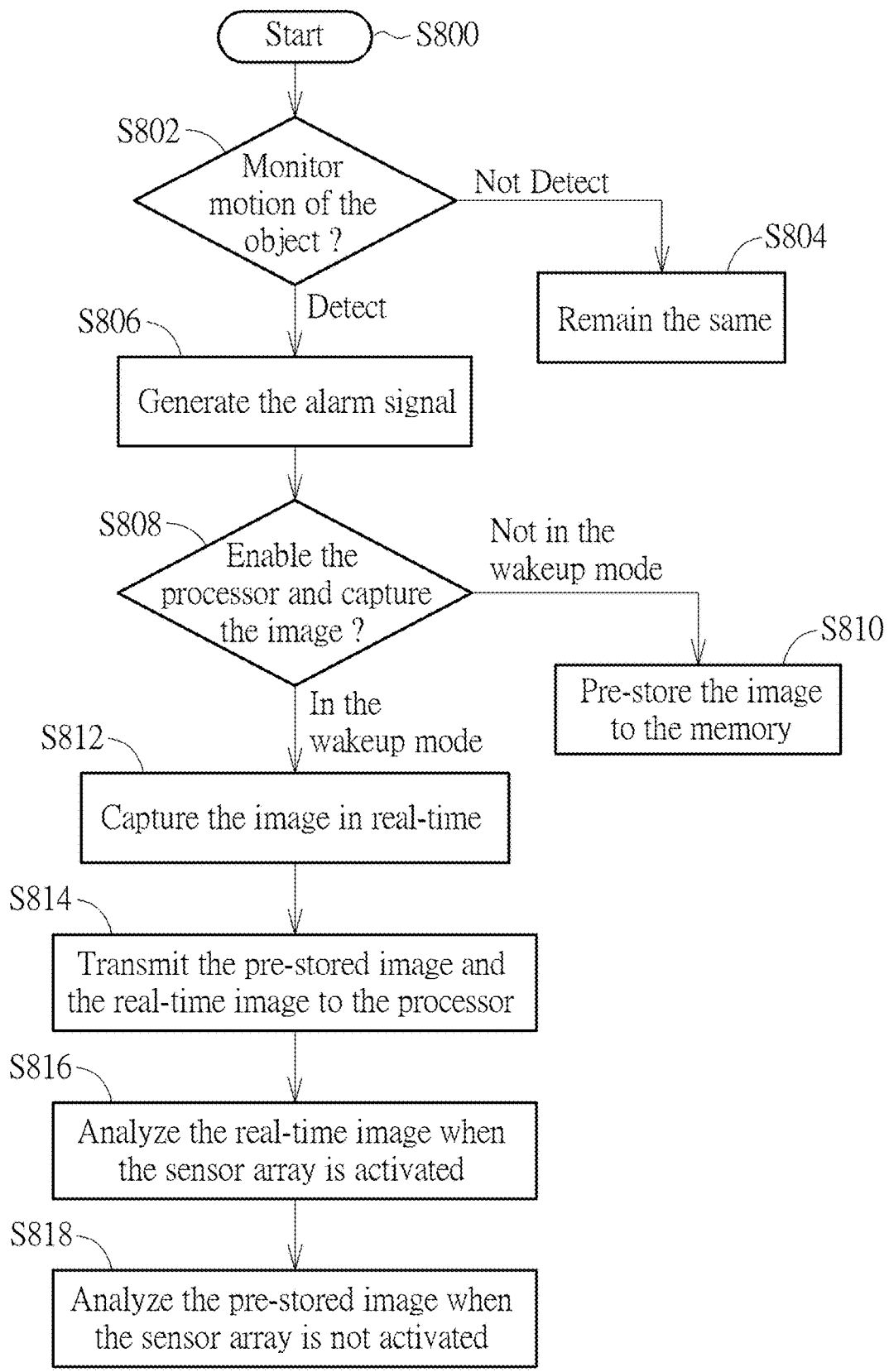
FIG. 16 is a flow char of a determining method according to the embodiment of the present invention.

Please refer to FIG. 16. FIG. 16 is a flow char of a determining method according to the embodiment of the present invention. The determining method illustrated in FIG. 16 can be suitable for the smart motion detection devices shown in FIG. 10 to FIG. 15. First, steps S800 and S802 are executed to start the determining method and to monitor the motion of the object. The said monitoring function can be applied by the sensor array 86, 86' and 86" or the passive sensor 92. As there is not abnormal situation, step S804 is executed to keep the processor 84 in the sleep mode; as the motion of the object is detected, steps S806 and S808 are executed to generate the alarm signal for enabling the processor 84 and capturing the image via the sensor array 86, 86' and 86". When the processor 84 is not operated in the wakeup mode, step S810 is executed that the sensor array 86, 86' or 86" can produce the pre-stored image I1 in the memory 82. When the processor 84 is operated in the wakeup mode, steps S812 and S814 are executed that the sensor array 86, 86' or 86" can produce the real-time image I2, and both the pre-stored image I1 and the real-time image I2 can be transmitted to the processor 84.

After that, step S816 is executed that the processor 84 can analyze the real-time image I2 captured by the sensor array 86, 86' or 86" when capturing function of the sensor array 86, 86' or 86" is activated. When the sensor array 86, 86' or 86" is not activated, probably owning to the disappeared object or any other situations, step S818 is executed to analyze the pre-stored image I1 inside the memory 82 by the processor 84. It should be mentioned that the processor 84 not only can process the real-time image I2 before the pre-stored image I1, but also alternately process the pre-stored image I1 and real-time image I2 in accordance with the user's actual demand and the sufficient operating capability.

In conclusion, the alarm signal may be generated by the sensor array or the passive sensor (which can be a thermal sensor, an accelerometer or a gyro). The alarm signal is utilized to activate pre-storing operation of the sensor array and mode switching operation of the processor. When the alarm signal is received, the sensor array can be activated to capture the pre-stored image at a first time and the pre-stored image is transmitted to the memory. For waiting a duration of the processor switched from the sleep mode to the wakeup mode, the processor which receives the alarm signal can send a request to the sensor array for the real-time image and the pre-stored image at a second time later than the first time, so that the pre-stored image from the memory are processed later than the first time, and the real-time image is not stored into the memory but directly transmitted to the processor for the digital processing. Comparing to the prior art, the smart motion detection device and the related determining method of the present invention can effectively economize start-up time of the smart motion detection device without waiting for a wakeup period of the processor.

Figure 17:
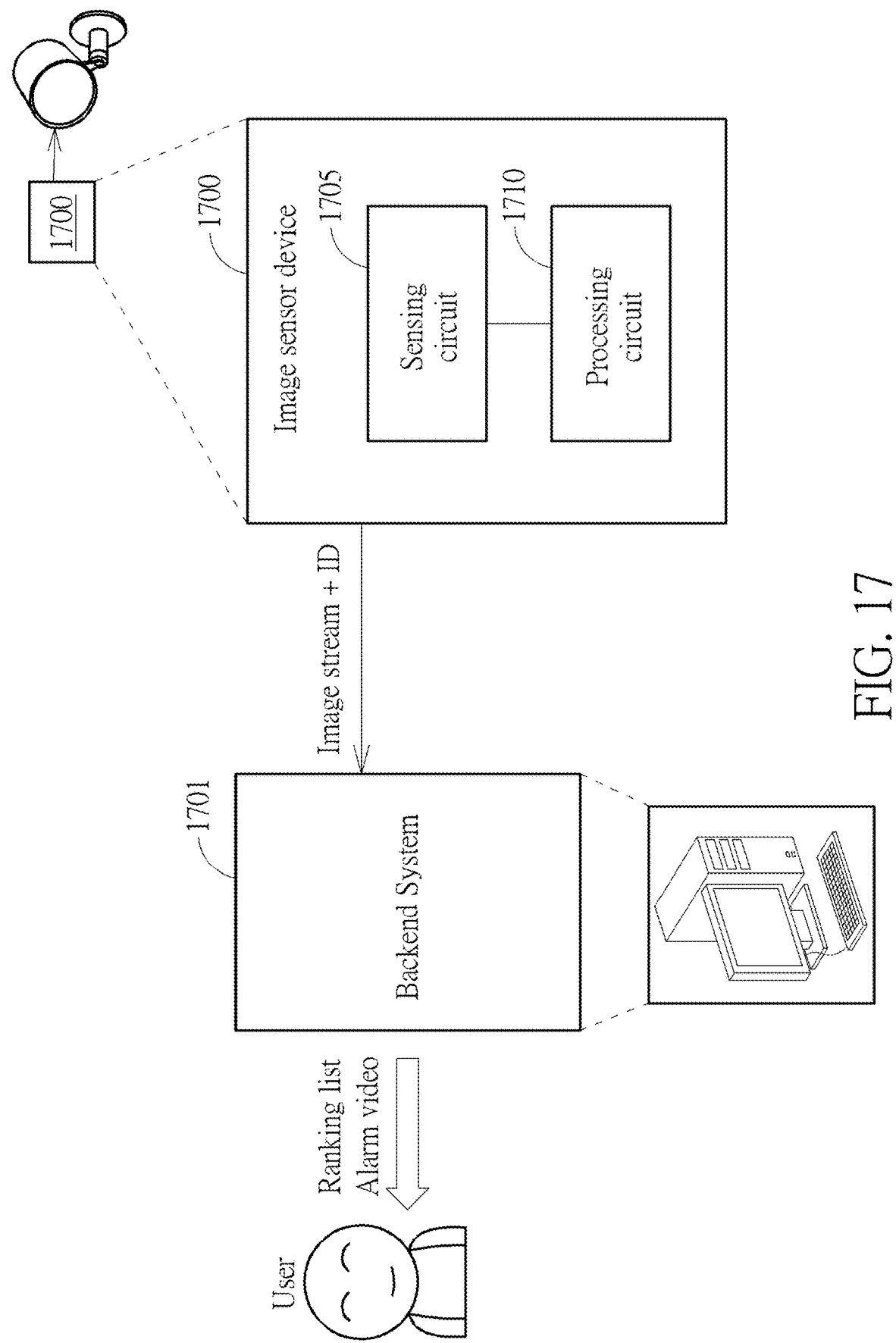
FIG. 17 is a block diagram of an image sensor device applied into a security monitoring system according to an embodiment of the invention.

FIG. 17 is a block diagram of an image sensor device 1700 applied into a security monitoring system according to an embodiment of the invention. The image sensor device 1700 is capable of generating one or more monitoring images, providing one or more regions of interest (ROIs) on one or more monitoring images, determining an alarm schedule of ROIs, and automatically generating a ranking list of ROIs and alarm videos for a user based on the priority levels of one or more ROIs. The priority levels can be automatically determined by the image sensor device 1700 after a period of usage time of the image sensor device 1700. An ROI may be also referred to as a window of interest (WOI); this is not intended to be a limitation. The image sensor device 1700 can be coupled to a backend system 1701 such as a computer device via wired or wireless communications, and the backend system 1701 can be arranged for automatically displaying related monitoring images for the user or can be operated by the user to display corresponding monitoring images. The image sensor device 1700 is arranged to transmit the ranking list of the ROIs and corresponding monitoring images to the backend system 1701, and the backend system 1701 can display the suggested ranking list of the ROIs so that the user can view monitoring images of specific ROI (s) sooner.

It should be noted that the operation of determining the alarm schedule of ROIs for the user may comprise outputting alarm video/image (s) of only one ROI real-timely or later, outputting alarm video/images of multiple ROIs real-timely or later, and/or arranging the output schedule of alarm video/images of multiple ROIs. Such operation is performed based on the priority levels of ROIs. For example, the alarm video/images of multiple ROIs can be scheduled to be outputted for the user periodically (e.g. every night or every weekend (not limited)) based on the priority levels of ROIs. It should be noted that, the alarm video/image(s) of only one ROI can be scheduled to be outputted for the user periodically (e.g. every night or every weekend (not limited)) based on the priority level of such ROI. For instance (but not limited), if the priority level of such ROI is urgent or important, the alarm video/image (s) of such ROI can be scheduled to be outputted for the user every night. Instead, if the priority level of such ROI is not urgent or unimportant, the alarm video/image (s) of such ROI may be scheduled to be outputted for the user every weekend.

The image sensor device 1700 can be configured or installed within a surveillance camera device or a security camera device of the security monitoring system, and the surveillance camera device, which comprising the image sensor device 1700 having the capability of automatically generating the ranking list of ROIs for the user, can be freely set at any locations or any positions or with any angles by the user.

The image sensor device 1700 automatically generates the ranking list of ROIs, in which an ROI having the higher priority level is ranked in the front of another ROI having the lower priority level, for the user, so that the user can view the images/videos of the ROI having the higher priority level at first or sooner and then view the images/videos of the ROI having the lower priority level if it is needed. By doing so, it is more efficient for the user to determine whether a specific/true motion event actually occurs, and also it is not needed for the user to manually adjust the location/position of the surveillance camera device to avoid undesired/unwanted image fluctuations. In other embodiments, images/videos corresponding to an ROI having a much lower priority level may be not displayed for the user to avoid meaningless interruptions/warnings for the user.

Figure 18:
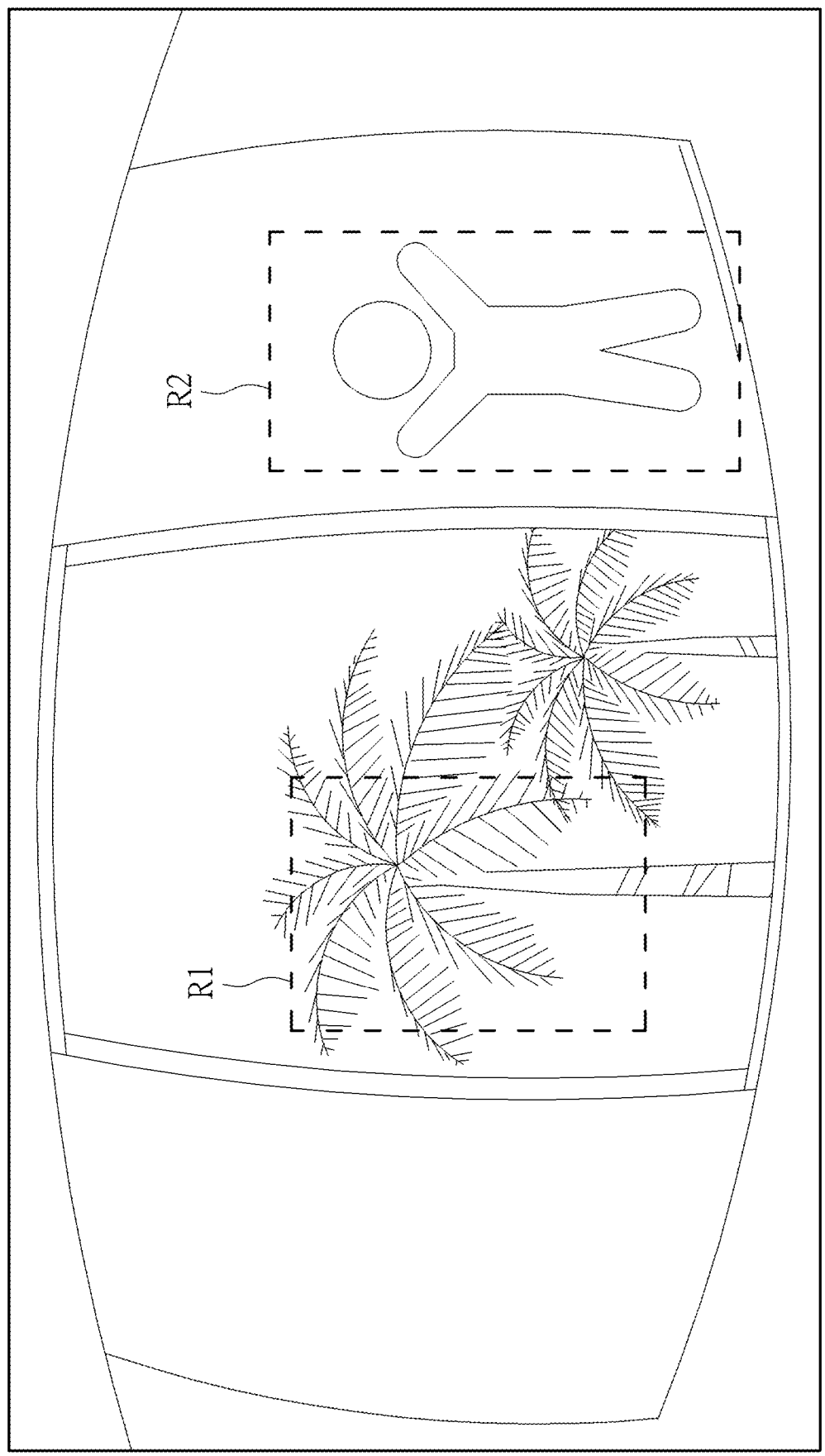
FIG. 18 is a diagram showing an example of ROIs on a monitoring image according to an embodiment of the invention.

Refer to FIG. 18. FIG. 18 is a diagram showing an example of ROIs on a monitoring image according to an embodiment of the invention. As shown in FIG. 18, the monitoring image at least comprises an outdoor image portion such as images of shaking leaves within the ROI R1 and an indoor image portion such as a human-shape image within the ROI R2. In this example, the motions of shaking leaves are undesired/unwanted image fluctuations, and the processing circuit 1710 for example can be arranged to rank the priority level of the ROI R2 at the front of that of ROI R1 based on the features of the images of shaking leaves and features of the human-shape image to make the user view the human-shape image sooner. It should be noted that the shapes and sizes of different ROIs can be identical or can be different.

Refer to FIG. 17 again. In practice, the image sensor device 1700 comprises a sensing circuit 1705 and a processing circuit 1710. The sensing circuit 1705 is used for generating one or more monitoring images and for providing a plurality of regions of interest (ROIs) on the monitoring image (s). For example (but not limited), the sensing circuit 1705 when being enabled is arranged to continuously capture images to generate monitoring images, and the ROIs are spatial regions respectively located on each monitoring image. The processing circuit 1710 is coupled to the sensing circuit 1705. For one or each ROI, the processing circuit 1710 is configured for detecting whether at least one motion event occurs within the one or each ROI and determining a priority level of the one or each ROI according to at least one feature information of the at least one motion event. After generating the priority levels of the ROIs, the processing circuit 1710 is arranged for automatically generating and outputting a ranking list of the ROIs for a user according to the priority levels of the ROIs.

Figure 19:
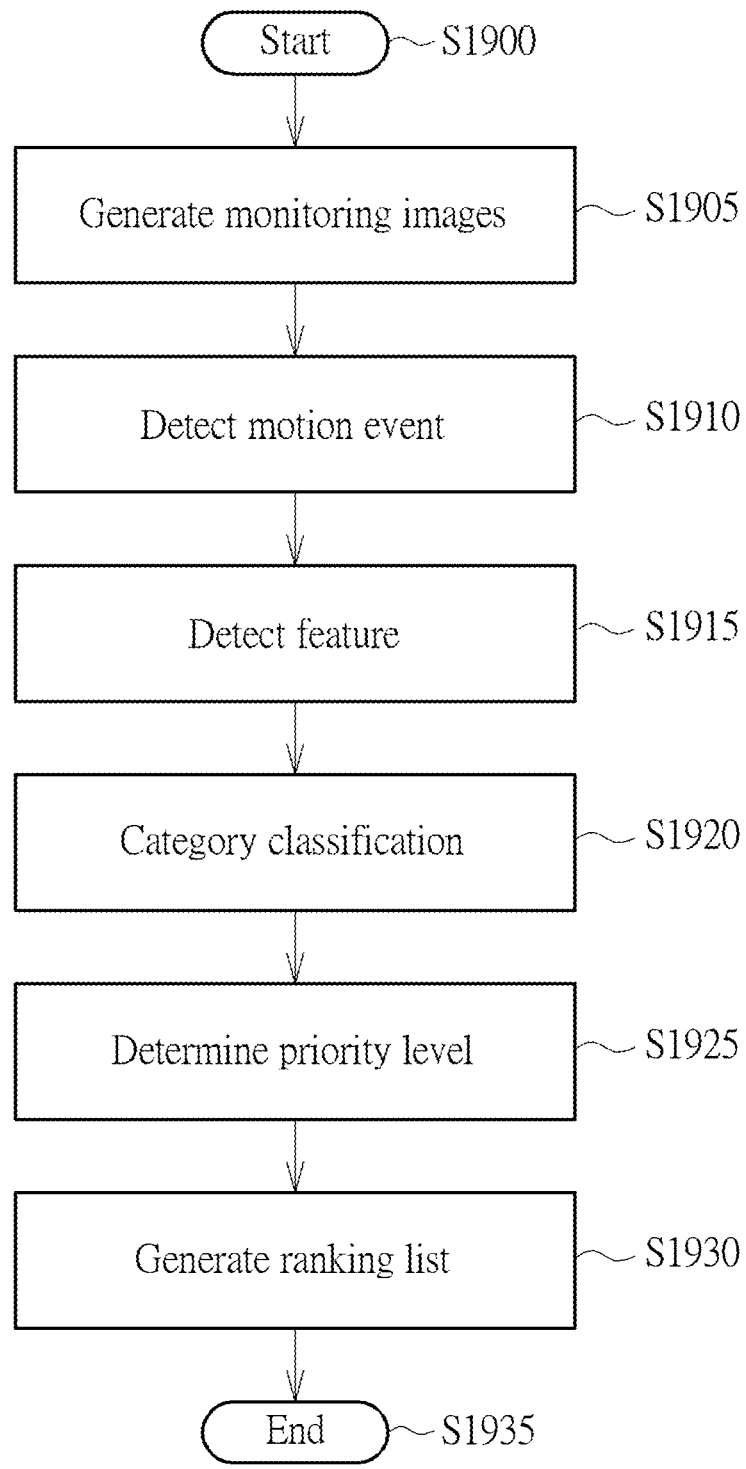
FIG. 19 is a flowchart diagram of a method of the image sensor device of FIG. 17 according to an embodiment of the invention.

FIG. 19 is a flowchart diagram of a method of the image sensor device 1700 of FIG. 17 according to an embodiment of the invention. The description of steps is simply described in the following:

Step S1900: start;

Step S1905: sensing circuit 1705 generates monitoring images and provides ROIs;

Step S1910: processing circuit 1710 detects motion event(s) within each ROI;

Step S1915: processing circuit 1710 detects feature(s) of motion event(s) within each ROI;

Step S1920: processing circuit 1710 classifies each motion event into one or more categories/types according to the feature(s) of each motion event for each ROI;

Step S1925: processing circuit 1710 determines the priority level of each ROI according to the number (s) of one or more classified categories of each ROI;

Step S1930: processing circuit 1710 generates the ranking list of ROIs according to the priority levels of the ROIs; and Step S1935: End Actually, an object (or motion object) may occur at a spatial position in a monitoring image, keep still or move slowly or fast, and finally may disappear at the same or a different position in another monitoring image. According to the monitoring images generated from the sensing circuit 1705, the processing circuit 1710 of FIG. 17 can detect and determine that the motion object occurs in a monitoring image and disappears in another monitoring image. Identically, based on the monitoring images, for a specific ROI or each ROI, the processing circuit 1710 can detect and determine that a motion object occurs in the ROI at a timestamp associated with a monitoring image and disappears in the ROI at another timestamp associated with another monitoring image, to generate a motion event for the ROI. Similarly, for the ROI, the processing circuit 1710 can detect and determine that different motion objects occur in the ROI at identical or different timestamps and disappear in the ROI at identical or different timestamps, to generate multiple different motion events for the ROI. Different ROIs may be associated with the motion events having identical, partially identical, or different features.

For example, if a motion object moves from an ROI to another ROI on the monitoring images, then the processing circuit 1710 generates two motion events, associated with the same motion object, individually for the two ROIs, and the features of the two motion events of the two ROIs in this situation may be identical (or may be partially identical since the timestamp information is different). Instead, if two different motion objects respectively occurs and disappears in different ROIs, then the processing circuit 1710 generates two motion events, associated with the different motion objects, individually for the two ROIs, and the features of the two motion events of the two ROIs in this situation are different (or may be partially different since some information such as color, shape, or timestamp information may be identical).

In practice, for one or each ROI, the processing circuit 1710 may compare one or more feature information of the one or more detected motion objects/events with candidate feature information, which may be pre-recorded in the memory circuit of the processing circuit 1710, to generate the feature information of the motion events occurring the one or each ROI. For example, at least one feature information of at least one motion event comprises at least one of the following features: a time of appearance/occurrence, a time which the at least one motion event disappears, a time length between the at least one motion event's occurring and disappearing, a frequency which the at least one motion event occurs, a regularity level which the at least one motion event occurs, at least one timestamp of the at least one motion event, a shape/color/size of at least one motion object in the at least one motion event, and a motion direction/speed of the at least one motion object, etc. Other feature information of motion objects may be included within and used as the feature information, and the examples of the above-mentioned feature information are not intended to be limitations. Similarly, the above-mentioned candidate feature information also comprises at least one of the above similar feature information.

After a period of usage time, the processing circuit 1710 can generate and record all the feature information of the motion events of the ROIs in a memory circuit (not shown in FIG. 17) of the processing circuit 1710. Then, the processing circuit 1710 can automatically generate and output the ranking list of the ROIs for the user according to the user's preferred settings or a default setting, so that the user can easily view important monitoring images within an ROI and ignore unimportant monitoring images within another ROI; the ROI having the most important monitoring images can be ranked first to make the user easily view the images of such ROI, and the importance can be determined by the processing circuit 1710 based on the user's preferred settings or the default setting.

In the embodiment, for example, for a specific or each ROI, the processing circuit 1710 can be arranged to classify multiple motion events having identical/similar features into a same category and classify motion events having different features into different categories. One motion event may be associated with one or more categories.

For example, in one embodiment, motion events having motion objects associated with identical/similar shapes/sizes may be classified into the same shape/size category, and motion events having motion objects associated with different/dissimilar shapes/sizes may be classified into different shape/size categories. For instance (but not limited), motion events of shaking leaves (or shaking grass) may be classified into the same leaf/grass category, motion events associated with human-shape motion objects may be classified into a different human-shape category, and motion events associated with vehicle-shape objects may be classified into another different vehicle-shape category. These examples are not intended to be limitations.

Further, in another embodiment, motion events having motion objects associated with identical/similar colors may be classified into the same category, and motion events having motion objects associated with different/dissimilar colors may be classified into different categories. For instance (but not limited), motion events corresponding to shaking leaves and motion events corresponding to shaking grass may be classified into the same green color category, and the motion events associated with human-shape motion objects may be classified into a different color category.

Further, in another embodiment, motion events corresponding to higher frequency motions and motion events corresponding to lower frequency motions may be classified into different categories respectively. For instance (but not limited), motion events corresponding to shaking leaves and motion events (high frequency motions) may be classified into the same high-frequency category, and the motion events associated with human motion objects (low frequency motions) may be classified into a different low-frequency category.

Further, in another embodiment, motion events corresponding to higher regularity motions and motion events corresponding to lower regularity motions may be classified into a different category respectively. For instance (but not limited), motion events corresponding to shaking leaves, shaking grasses, or the place/time which people usually come and go may be classified into the same high-regularity category since the motion events are associated with higher regularity level, and the motion events corresponding to motion objects occurring in the place/time which people rarely come and go may be classified into a different low-regularity category since the motion events are associated with lower regularity level.

Further, in another embodiment, motion events corresponding to different time periods such as morning session (s), noon session (s), afternoon session(s), night session(s), working hours, off-hours, and etc. may be classified into different categories respectively. For instance (but not limited), motion events corresponding to working hours may be classified into the same working-hours category, and the motion events corresponding to off-hours may be classified into a different off-hours category.

Similarly, motion events corresponding to different times of appearance/occurrence/disappearing, different time lengths between occurring and disappearing, different timestamps, and/or different motion directions/speeds are respectively classified into different categories, and motion events corresponding to the same/similar features are classified into the same category.

It should be noted that the processing circuit 1710 is capable of classify one motion event into multiple categories in accordance with at least one of the above-mentioned feature information. For instance, a motion event corresponding to a motion object occurring in the place which people rarely come and go during off-hours for a specific time length may be classified and have three different categories which respectively indicate that the motion object occurs in the place which people rarely come and go, the motion object occurs during the off-hours, and indicate the motion object occurs for the specific time length. This example is not meant to be a limitation of the invention.

Based on the classified categories of the different ROIs, the processing circuit 1710 then is arranged to grade the different ROIs by giving different scores to the different categories so as to generate the priority levels of the different ROIs. For example (but not limited), for security monitoring, a leaf-shape (or grass-shape) category corresponds to a lower score while a human-shape category or a vehicle-shape category corresponds to a higher score; a green color category corresponds to a lower score while a different color category corresponds to a higher score; a high-frequency category corresponds to a lower score while a low-frequency category corresponds to a higher score; a high-regularity category corresponds to a lower score while a low-regularity category corresponds to a higher score; a working-hours category corresponds to a lower score while an off-hours category corresponds to a higher score; the examples are not intended to be limitations of the invention. Other modification examples are also suitable.

After giving scores to the categories of the different ROIs, the processing circuit 1710 is arranged to calculate the sum or average (or weighted average) of all scores of each ROI and then to determine the priority levels of the different ROIs based on the sum or average of scores of each ROI wherein a higher sum or average corresponds to a higher priority level. For example, the priority level of a first ROI, which is associated with a motion event corresponding to a motion object occurring in the place which people rarely come and go during off-hours with a lower regularity level, may be ranked near the top (or for the first one) of the ranking list, and the priority level of a second ROI, which is associated with another motion event corresponding to another motion object such as shaking leaves with a higher regularity level, may be ranked near the bottom or the last one of the ranking list. By doing so, once a user receives the ranking list, the user can view the monitoring images within the first ROI to see the images of such important motion event by eyes sooner and ignore the images of the second ROI.

Figure 20:
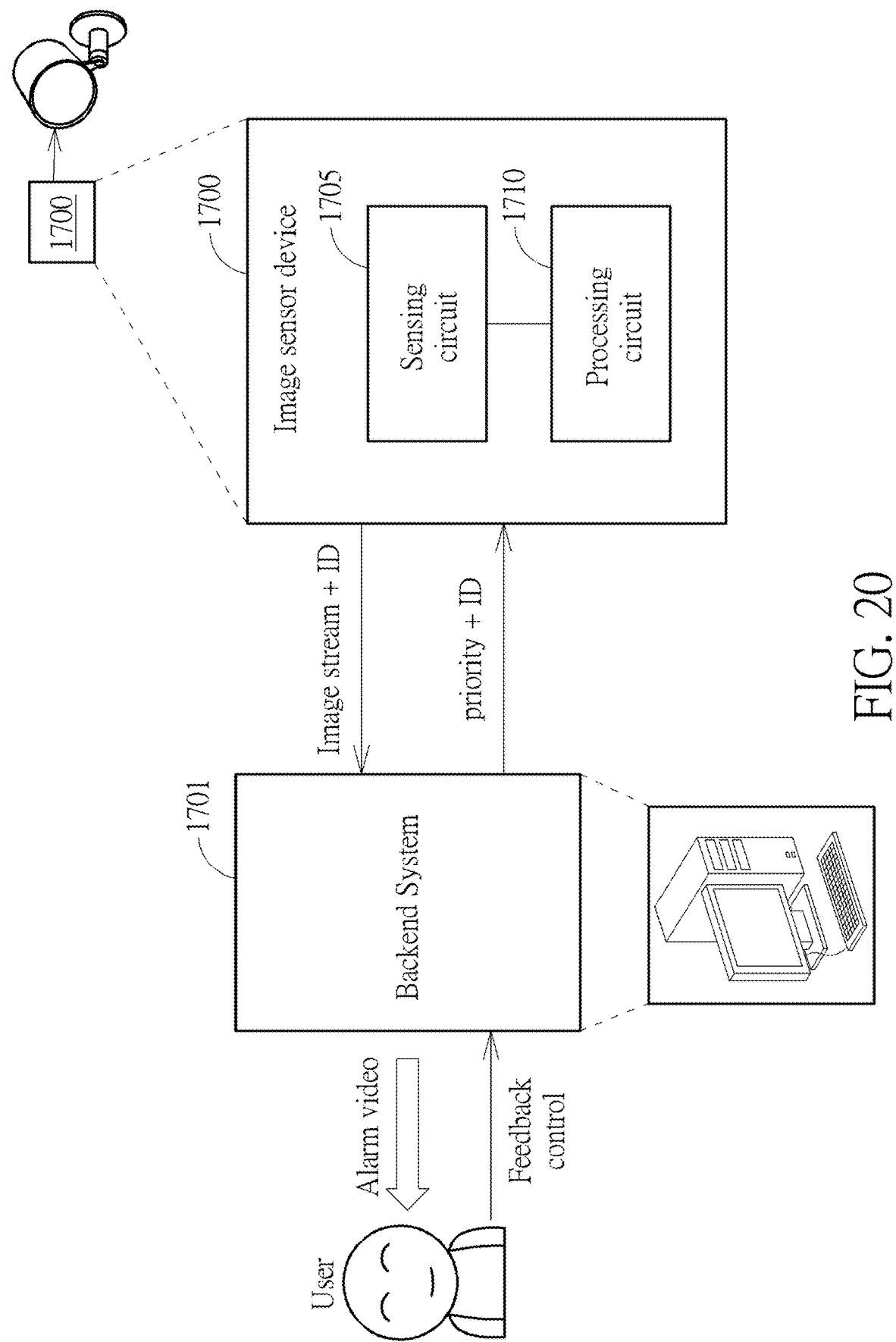
FIG. 20 is a block diagram of the image sensor device applied into the security monitoring system according to another embodiment of the invention.

In another embodiment, the image sensor device 1700 is capable of providing a feedback control operation which can receive the user's request/feedback control to real-timely or dynamically adjust the priority level(s) of one or more ROIs. FIG. 20 is a block diagram of the image sensor device 1700 applied into the security monitoring system according to another embodiment of the invention. In this embodiment, the processing circuit 1710 is arranged to tag unique identification (ID) information for each motion event within each ROI. When a motion event is detected by the processing circuit 1710, the processing circuit 1710 transmits the image stream associated with such motion event and the tagged ID information to the backend system 1701, and this tagged ID information can be used as an alarm ID of such motion event. The backend system 1701 generates the alarm video, which comprises the image streams and alarm ID, for the user.

The user can adjust the priority level of an ROI corresponding to such motion event or adjust the priority of such motion event by operating the backend system 1701 to generate a feedback control to the backend system 1701 or by using a mobile device to generate a feedback control signal to the backend system 1701. The backend system 1701 transmits the adjusted priority information and the alarm ID to the image sensor device 1700, and the processing circuit 1710 can adjust up or adjust down the priority level of the ROI corresponding to such motion event or adjust the priority of such motion event. For example, in a scenario, if the motion event and alarm video are associated with shaking leaves (but not limited), i.e. the motion event and alarm video which the user would like to ignore, the user may press/click/touch a dislike icon for the alarm video, and the processing circuit 1710 can adjust down the priority level of a specific ROI corresponding to the alarm video based on the motion event's ID information which is associated with the received alarm ID information corresponding to the alarm video. Alternatively, in another scenario, a motion event and alarm video may be associated with a human-shape motion object (but not limited), i.e. the motion event and alarm video which the user can press/click/touch a like icon for the alarm video, and the processing circuit 1710 can adjust up or keep the priority level of a specific ROI corresponding to the alarm video based on the motion event's ID information which is associated with the received alarm ID information corresponding to the alarm video. Thus, by doing so, the ranking list of the ROIs can be dynamically or real-timely updated for the user based on the user's feedback control/behavior.

Additionally, the processing circuit 1710 is arranged to assign different ID information for multiple motion events having one or more identical features. For example, a motion event of shaking leaves and a motion event of shaking grass are assigned two different unique IDs respectively wherein the shaking leaves and shaking grass at least include identical features of green color. Then the processing circuit 1710 classifies the motion events having one or more identical features into a same event group (i.e. a same category). Then, in response to the user's adjustment setting for a particular motion event in the motion events, the processing circuit 1710 can determine or identify one or more ROIs which are associated with the motion events belonging to the same event group (or the same category) based on the different IDs. Then, the processing circuit 1710 can adjust one or more priority levels of the one or more ROIs according to the same/identical adjustment of the user which made for the particular motion event in a specific ROI. That is, if the user would like to adjust the priority of a specific motion event, the processing circuit 1710 can determine which motion event(s) and which ROI(s) are associated with the category of the specific motion event based on the different IDs, and then it can adjust the priority level(s) of the determined ROI(s) based on the same adjustment made for the specific motion event.

Further, in other embodiments, the image sensor device 1700 or the security monitoring system may comprise different notification modes. The processing circuit 1710 can employ different notification modes based on the different priority levels of the ROIs and transmit different notifications of alarm videos associated with the different ROIs to the user according to the different notification modes. The processing circuit 1710 may transmit a first notification to the user to notify the user of a first motion event occurring within a first ROI according to a first notification mode, and it may transmit a second notification to the user to notify the user of a second motion event occurring within a second ROI according to a second notification mode. The first notification mode is more urgent than the second notification mode when a priority level of the first ROI is higher than a priority level of the second ROI. Also, the priority levels can be dynamically or real-timely adjusted based on the user's adjustment or request. For example, the processing circuit 1710 may instantly transmit a notification for the user according to an instant notification mode if the processing circuit 1710 detects a motion event occurring within a specific ROI. A user may press/click/touch a dislike icon for the alarm video of such motion event to send a feedback control signal to the backend system 1701, and the processing circuit 1710 can lower the priority level of the specific ROI according to the feedback control signal transferred from the backend system 1701 and may use a later notification mode to notify the user if an identical/similar motion event occurs in the specific ROI again. The later notification mode may mean that the notification is generated after waiting for a time period such as minutes, hours, days, or etc. Alternatively, the later notification mode may indicate that the processing circuit 1710 can generate a summary report, which is associated with the identical/similar/different features of all motion events in the specific ROI, for the user after waiting for the time period. Alternatively, the processing circuit 1710 may determine not notifying the user when an identical/similar motion event occurs in the specific ROI again if the user repeatedly presses/clicks/touches the dislike icon for an alarm video of the identical/similar motion event.

Figure 21:
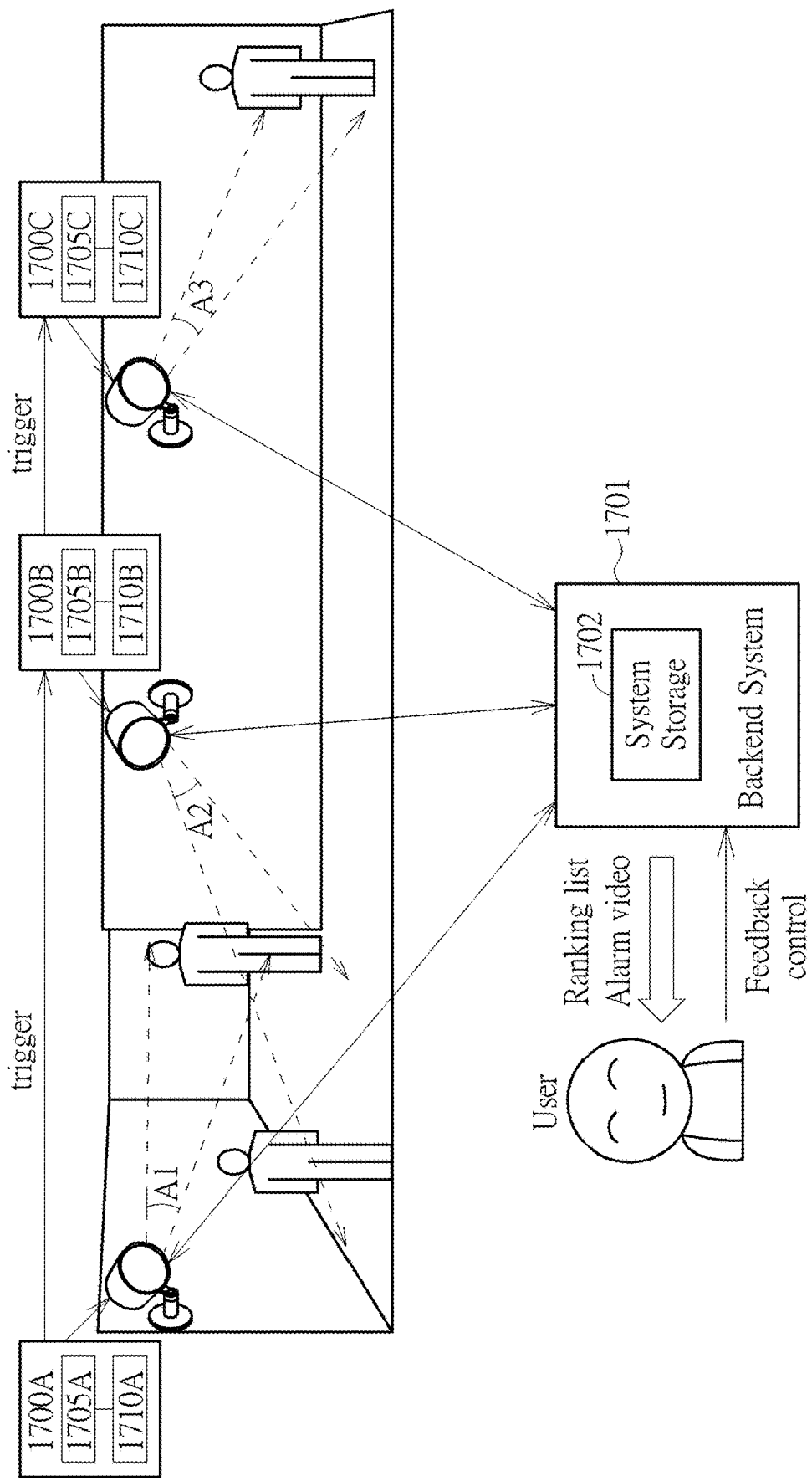
FIG. 21 is a diagram of an example of multiple image sensor devices respectively comprised by or installed within different camera devices being disposed at different locations in a security monitoring system according to an embodiment of the invention.

Additionally, in other embodiments, different image streams of motion events detected by different image sensor devices can be merged or combined to generate and provide a merged image stream for the user. Refer to FIG. 21. FIG. 21 is a diagram of an example of multiple image sensor devices 1700A, 1700B, 1700C respectively comprised by or installed within different camera devices being disposed at different locations in a security monitoring system according to an embodiment of the invention. It should be noted FIG. 21 shows three image sensor devices; however, this is not intended to be a limitation. The number of image sensor devices can be equal to or more than two. In addition, the locations at which the image sensor devices disposed are also not limited. As shown in FIG. 21, the multiple image sensor devices 1700A, 1700B, 1700C are arranged to capture monitoring images at different locations based on different field of views A1, A2, A3 so as to generate multiple image streams. In this embodiment, the image sensor devices 1700A, 1700B, 1700C respectively comprise the corresponding sensing circuits 1705A, 1702B, 1705C and processing circuits 1710A, 1710B, 1710C, and the basic functions and operations of circuits 1705A, 1705B, 1705C and 1710A, 1710B, 1710C are respectively similar to those of circuits 1705 and 1710 mentioned above. In addition, the backend system 1701 further comprises a system storage 1702 which may be implemented by using a memory circuit and used for storing image streams, motion events, corresponding timestamps, and corresponding IDs.

For example, in one embodiment, a motion object such as a human-shape object (but not limited) may occur in the field of views of the image sensor devices 1700A, 1700B, 1700C, sequentially. That is, the image sensor devices 1700A, 1700B, 1700C may sequentially use different/identical ROIs to capture the image streams corresponding to the motion object.

For instance, the processing circuit 1710A may detect a motion event EA, which is associated with the human-shape motion object, within an ROI RA on monitoring images generated from the sensing circuit 1705A, and the processing circuit 1710A is arranged to identify and generate the feature information of the motion event EA and also tag a timestamp tA and unique ID ID_A to the motion event EA. Then, the processing circuit 1710A transmits and outputs the motion event EA, image streams of motion event EA, timestamp tA, and the ID ID_A to the backend system 1701, and the backend system 1701 stores such information into the system storage 1702.

Later, the processing circuit 1710B may detect a motion event EB, which is also associated with the same human-shape motion object, within an ROI RB on monitoring images generated from the sensing circuit 1705B, and the processing circuit 1710B is arranged to identify and generate the feature information of the motion event EB and tag a timestamp tB to the motion event EA. In this situation, the processing circuit 1710B is arranged to transmit a request signal to the backend system 1701 to make the backend system 1701 search the space of the system storage 1702 according to the generated feature information of motion event EB and the timestamp tB. The backend system 1701 can compare the feature information of motion event EB (and/or the timestamp tB) with the stored feature information such as feature information of motion event EA (and/or stored timestamp such as timestamp tA) to check whether the features are identical or similar and/or check whether the timestamps are adjacent or close.

In this example, the features of motion events EA and EB are identical/similar and the corresponding timestamps are adjacent, and the backend system 1701 is arranged to transmit the ID of the previous motion event EA to the processing circuit 1710B. If the features are not identical/similar and the corresponding timestamps are not adjacent/close, then the backend system 1701 is arranged to not transmit the ID ID_A of the previous motion event EA and notify the processing circuit 1710B of using a new unique ID. After receiving the ID ID_A of the motion event EA, the processing circuit 1710B uses ID ID_A as the ID of the motion event EB, tags the ID ID_A into the image streams of the motion event EB, and outputs the image streams of motion event EB to the backend system 1710.

Similarly, for the image sensor device 1700C, the processing circuit 1710C may tag the ID ID_A into image streams of a detected motion event EC and then transmit the image streams with the ID ID_A to the backend system 1701 if the feature of motion event EC is identical/similar to that of motion event EA/EB and/or timestamp tC is adjacent to timestamp EA/EB. Finally, the backend system 1701 can merge or combine the motion events' image streams having the same/similar features according to the order or sequence of the timestamps, to generate a merged image stream as an alarm video for the user. For example, the merged image stream comprise the image stream of motion event EA which is followed by the image stream of motion event EB which is followed by the image stream of motion event EC if the timestamp tC is later than the timestamp tB which is later than the timestamp tA.

By doing so, the user can directly view the alarm video which comprises a full or complete movement history of the human-shape motion object passing through the places at which the image sensor devices 1700A, 1700B, and 1700C are disposed. It is more convenient for the user since the user does not need to manually check different camera devices.

In addition, in another embodiment, each of the processing circuits 1710A, 1710B, 1710C is capable of merging the image streams if it is needed. For example, the system storage 1702 can be inside or outside the backend system and is coupled to the image sensor devices 1700A, 1700B, 1700C via wired/wireless communications. In the above example of the human-shape motion object, the processing circuit such as 1710B is able to search the space of system storage 1702 according to the generated feature information of motion event EB and the timestamp tB, to compare the feature information of motion event EB (and/or the timestamp tB) with the stored feature information such as feature information of motion event EA (and/or stored timestamp such as timestamp tA) to check whether the features are identical or similar and/or check whether the timestamps are adjacent or close. In this situation, the features of motion events EA and EB are identical/similar and the corresponding timestamps are adjacent, and the processing circuit 1710B uses the ID ID_A of motion event EA as the ID of motion event EB (i.e. tags the ID ID_A into the motion event EB) so that the image streams of motion events EA and EB are equivalently merged and the corresponding timestamps tA and tB are also merged due to the same ID ID_A.

Instead, if the features are not identical/similar and the corresponding timestamps are not adjacent/close, then the processing circuit 1710B uses a unique and new ID, different from the ID ID_A, as the ID of motion event EB, and the image streams are not merged since of the different IDs.

Similarly, in the example, the processing circuit 1710C later uses the ID ID_A of motion event EA as the ID of motion event EC (i.e. tags the ID ID_A into the motion event EC) so that the image streams of motion events EA, EB, and EC are equivalently merged and the corresponding timestamps tA, tB, and tC are also merged since of the same ID ID_A. Then, the backend system 1701 can directly output the alarm video, which comprises the image streams of motion events EA, EB, and EC, for the user according to the order or sequence of the timestamps tA, tB, and tC and the same ID ID_A of the motion events EA, EB, and EC.

By doing so, once the user sends a user request to the backend system 1701 to ask the monitoring images of a specific camera device disposed at a specific location, the backend system 1701 can automatically output other image streams of other different camera devices, associated with the same/similar features and/or adjacent timestamps, for the user, in addition to outputting the image streams of the specific camera device. The other different camera devices may be spatially neighboring or can be disposed in other different locations/buildings. That is, the image sensor devices 1700A, 1700B, 1700C can generate and output at least one image of a first motion event and at least one image of a second motion event for the user in response to the user request which asks the second motion event if the ID of the first motion event is identical to the ID of the second motion event.

It should be noted that each processing circuit can be arranged to compare the timestamps to determine whether the timestamps are adjacent or close. For example, the processing circuit may determine that a second timestamp is adjacent or close to a first timestamp if the second timestamp is followed by N timestamps which is followed by the first timestamp wherein the value of N may range from zero to a threshold value. That is, if two timestamps are separated by more than N consecutive timestamps, then the two timestamps are not adjacent; otherwise, the two timestamps are adjacent. However, this example definition is not meant to be a limitation of the invention.

In addition, if a timestamp of a second motion event is previous to a timestamp of a first motion event and the two motion events are associated with the same/similar features, then the processing circuit 1710A, 1710B, or 1710C may determine that the first motion event is next to the second motion event which is obtained from the system storage 1702.

Further, in one embodiment, the backend system 1701 or each of the image sensor devices 1700A, 1700B, 1700C is able to store a relation between multiple image sensor devices if the motion events generated from the image sensor devices are associated with the same/similar features and/or adjacent timestamps. For instance, in the above example, the image sensor devices 1700A, 1700B, 1700C may respectively and sequentially detects motion events EA, EB, EC which are all associated with the same motion object such as a human-shape motion object passing through the locations at which the image sensor devices 1700A, 1700B, 1700C are disposed. The motion events EA, EB, EC are associated with the same/similar features and adjacent timestamps, and the timestamp tC is later than the timestamp tB that is later than the timestamp tA.

For the image sensor device 1700B, when detecting the motion event EB, the processing circuit 1710B can compare the features and timestamps of the motion events EB and EA and then determine that the features are identical/similar and the timestamps are adjacent. In this situation, in addition to using the ID of the motion event EA as the ID of the motion event EB, the processing circuit 1710B further generates a relation data RD1 of the devices 1700A and 1700B to indicate that the devices have a relation wherein the relation data RD1 corresponds to the same ID of motion events EA and EB. Such relation data RD1 is transmitted to the image sensor device 1700A so that each of the image sensor devices 1700A and 1700B stores the relation data RD1 corresponding to the same ID.

Then, for the image sensor device 1700C, when detecting the motion event EC, the processing circuit 1710C can compare the features and timestamps of the motion events EC and EB (or EA) and then determine that the features are identical/similar and the timestamps are adjacent. In this situation, in addition to using the ID of the motion event EA (i.e. the ID of motion event EB since the ID is identical) as the ID of the motion event EC, the processing circuit 1710C further generates another relation data RD2 of the devices 1700A, 1700B, and 1700C to indicate that the three devices have a relation wherein the another relation data RD2 corresponds to the same ID of motion events EA, EB, and EC. Such relation data RD2 is transmitted to the image sensor device 1700A and 1700B so that each of the three image sensor devices 1700A, 1700B, and 1700C stores the relation data RD2 corresponding to the same ID. It should be noted that the relation data RD2 will replace the relation data RD1 for the image sensor devices 1700A and 1700B since the data RD1 and RD2 are associated with the same ID and the version of data RD2 is new.

Later, when any image sensor device is enabled and detects a motion event of a specific or any motion object, such image sensor device can generate a trigger signal to other adjacent image sensor device (s) indicated by the stored relation data. For example, as shown in FIG. 21, the image sensor device 1700A (but not limited) can send a trigger signal to the image sensor devices 1700B and 1700C based on the above-mentioned relation data RD2 via wired/wireless communications. Once receiving the trigger signal, the image sensor devices 1700B and 1700C can respectively exit a power saving mode and enters a monitoring mode so that the image sensor devices 1700B and 1700C can be ready to detect and monitor the motion/movement of the specific or any motion object so as to pre-record one or more monitoring images.

Further, in another embodiment, the image sensor devices 1700B and 1700C may sequentially enter the monitoring mode. For example, the relation data RD2 may also record the information of timestamps tA, tB, and tC, and based on such relation data RD2 the image sensor device 1700A can identify which image sensor device is a next one to be ready to detect the movement of the specific or any motion object and then may send a trigger signal to only the image sensor device 1700B. Once receiving the trigger signal, the image sensor device 1700B enters the monitoring mode while the image sensor device 1700C is kept in the power saving mode since the trigger is not yet transmitted to the image sensor device 1700C. Then, when the image sensor device 1700B also detects the movement of the specific or any motion object, it sends a trigger signal to the image sensor device 1700C based on the relation data RD2 which indicates that the timestamp tC is later than the timestamp tB. Once receiving the trigger signal, the image sensor device 1700C enters the monitoring mode. That is, adjacent image sensor devices can be arranged to simultaneously enter the monitoring mode or can sequentially enter the monitoring mode one by one based on the relation data. This can be configured or adjusted by the user's preferred setting.

Further, in other embodiments, the operation of sending the trigger signal to other adjacent image sensor device(s) can be also controlled and executed by the backend system 1701. That is, the relation data such as RD2 can be stored by the backend system 1701. When the image sensor device 1700A detects a motion object, the backend system 1701 can send the trigger signal to the image sensor device 1700B and/or the image sensor device 1700C based on the relation data RD2.

Further, in one embodiment, the backend system 1701 can be arranged for automatically generating and outputting a ranking list of the adjacent image sensor devices 1700A, 1700B, 1700C for the user according to the relation data RD2. Such ranking list does to comprise one or more image senor devices which are not adjacent to any one of the group of mage sensor devices 1700A, 1700B, 1700C. The backend system 1701 can generate different ranking lists of different groups of image sensor devices for the user according to multiple different sets of relation data, and the different ranking lists of different groups of image sensor devices can be combined with the raking lists of the ROIs of each image sensor device. Thus, for example, when the user presses/clicks/touches a like icon for a notification/alarm video of a specific image sensor (or a specific ROI of the specific image sensor device), one or more image sensor devices, which are adjacent to the specific image sensor device, can be ranked at the top of a ranking list, and one or more ROIs, which are associated with the same/similar features of the specific ROI, can be ranked at the front of ROI(s), that are not associated with the same/similar features, in the ranking list. All the operations mentioned above can be controlled by the backend system 1701 or each image sensor device and are not detailed again for brevity.

Figure 22:
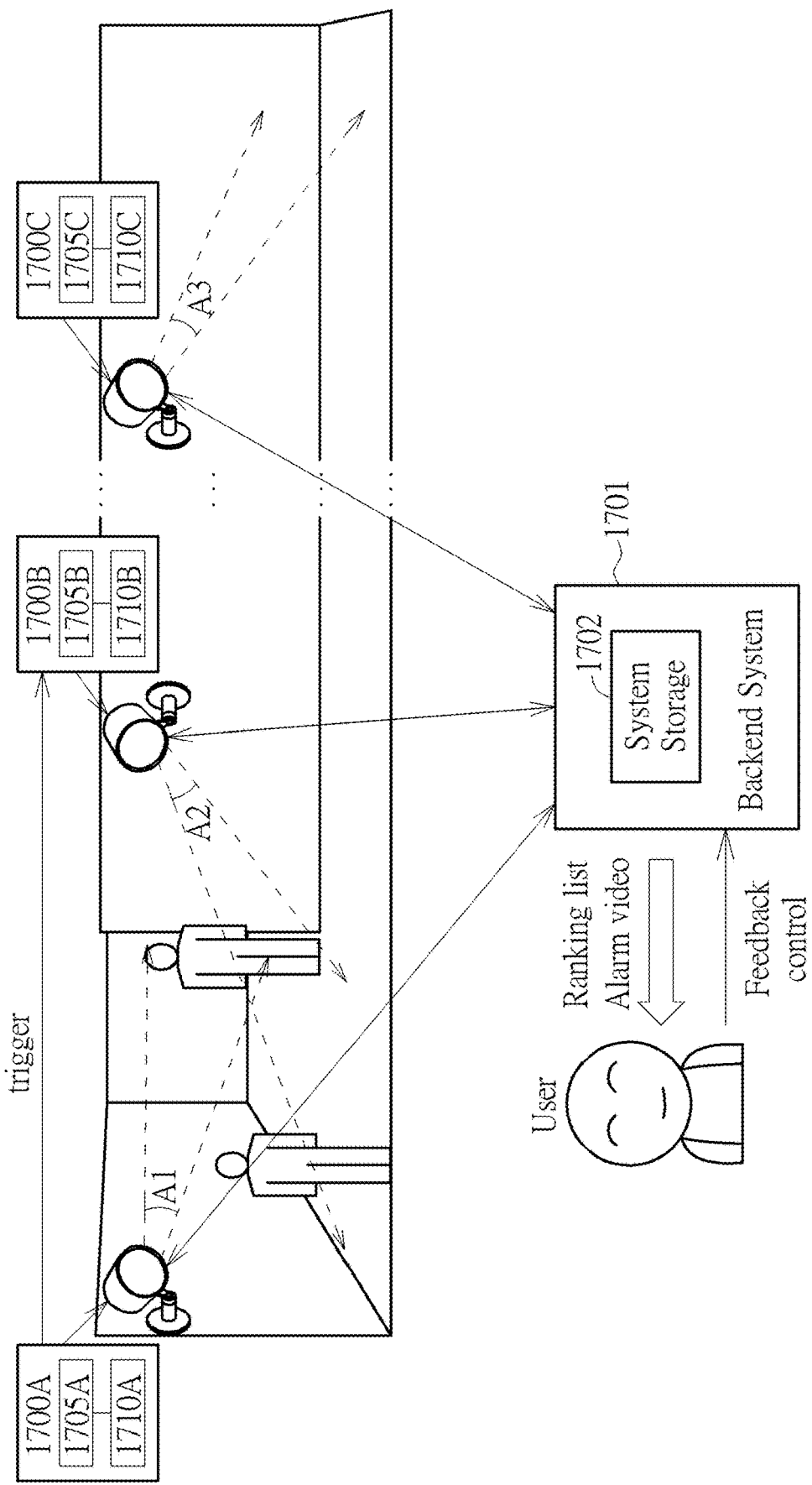
FIG. 22 is a diagram an example of the image sensor devices according to a different embodiment of the invention.
Figure 23:
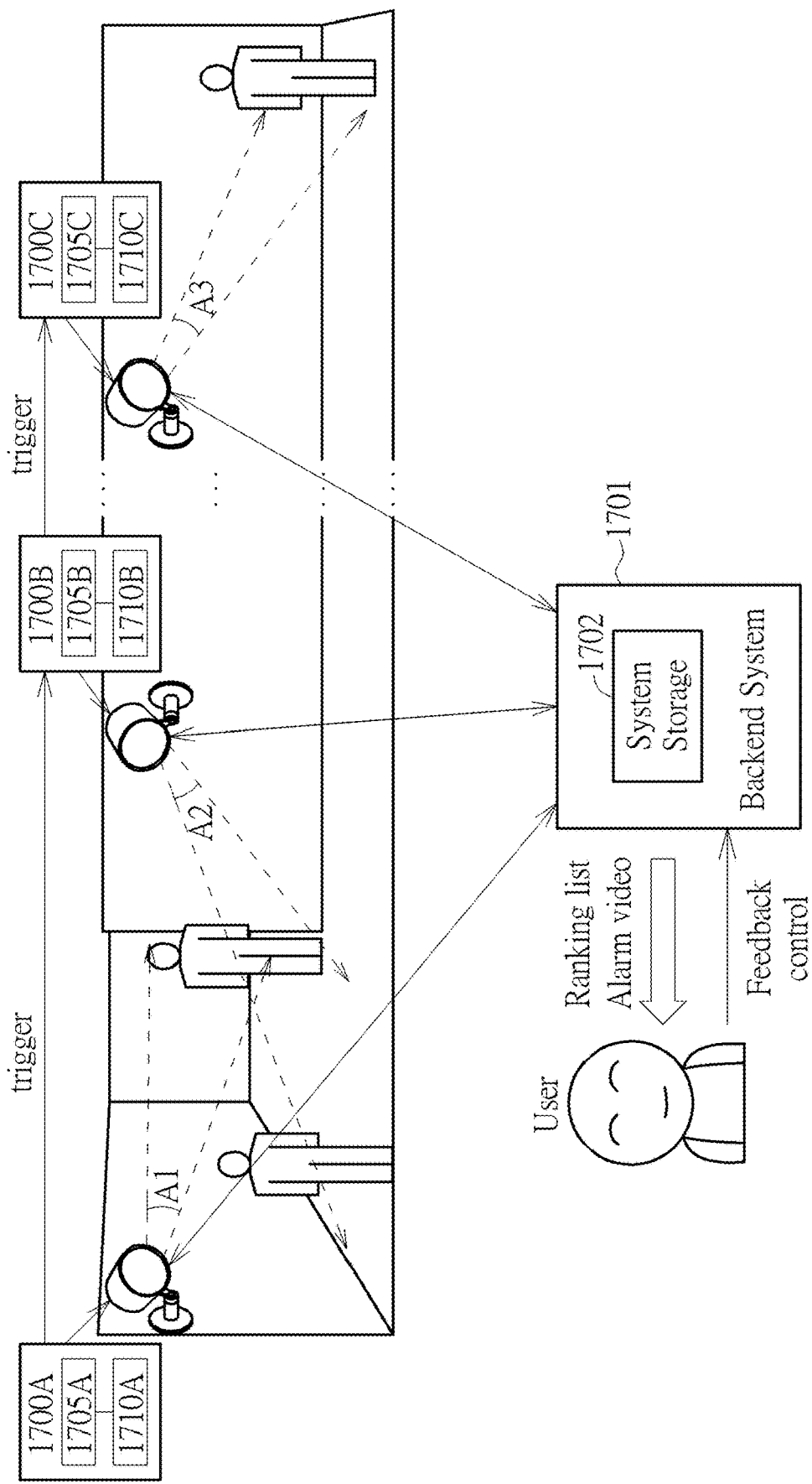
FIG. 23 is a diagram another example of the image sensor devices according to another different embodiment of the invention.

Additionally, in one embodiment, the location of a camera device comprising an image sensor device may be away from those of other devices. FIG. 22 and FIG. 23 are diagrams respectively showing different examples of the image sensor devices according to different embodiments of the invention. As shown in FIG. 22, the image sensor device 1700C may be away from other image sensor devices 1700A, 1700B, and the processing circuit 1710C determines that the device 1700 does not have a relation with the devices 1700A, 1700B if the image sensor device 1700C does not detect one or more motion event having the features which are identical or similar to that of the motion event detected by the other image sensor devices 1700A, 1700B. In this situation, neither the processing circuit 1710A nor processing circuit 1710B sends the trigger signal to the image sensor device 1700C. Instead, as shown in the example of FIG. 23, the image sensor device 1700C is away from other image sensor devices 1700A, 1700B, and the processing circuit 1710C determines that the device 1700 exactly has a relation with the devices 1700A, 1700B since the image sensor device 1700C detects one or more motion events having the features which are identical or similar to that of the motion event detected by the other image sensor devices 1700A, 1700B. For example, the image sensor device 1700C also detects the motion events of the same human-shape motion object at a non-adjacent timestamp. In this situation, the processing circuit 1710A or processing circuit 1710B is arranged to send the trigger signal to the image sensor device 1700C.

Further, it should be noted that the above-mentioned operations can be applied into detecting and monitoring one or more vehicles. The feature of a vehicle device may further comprise at least one of the vehicle's license plate, color, size, shape, height, etc.

Figure 24:
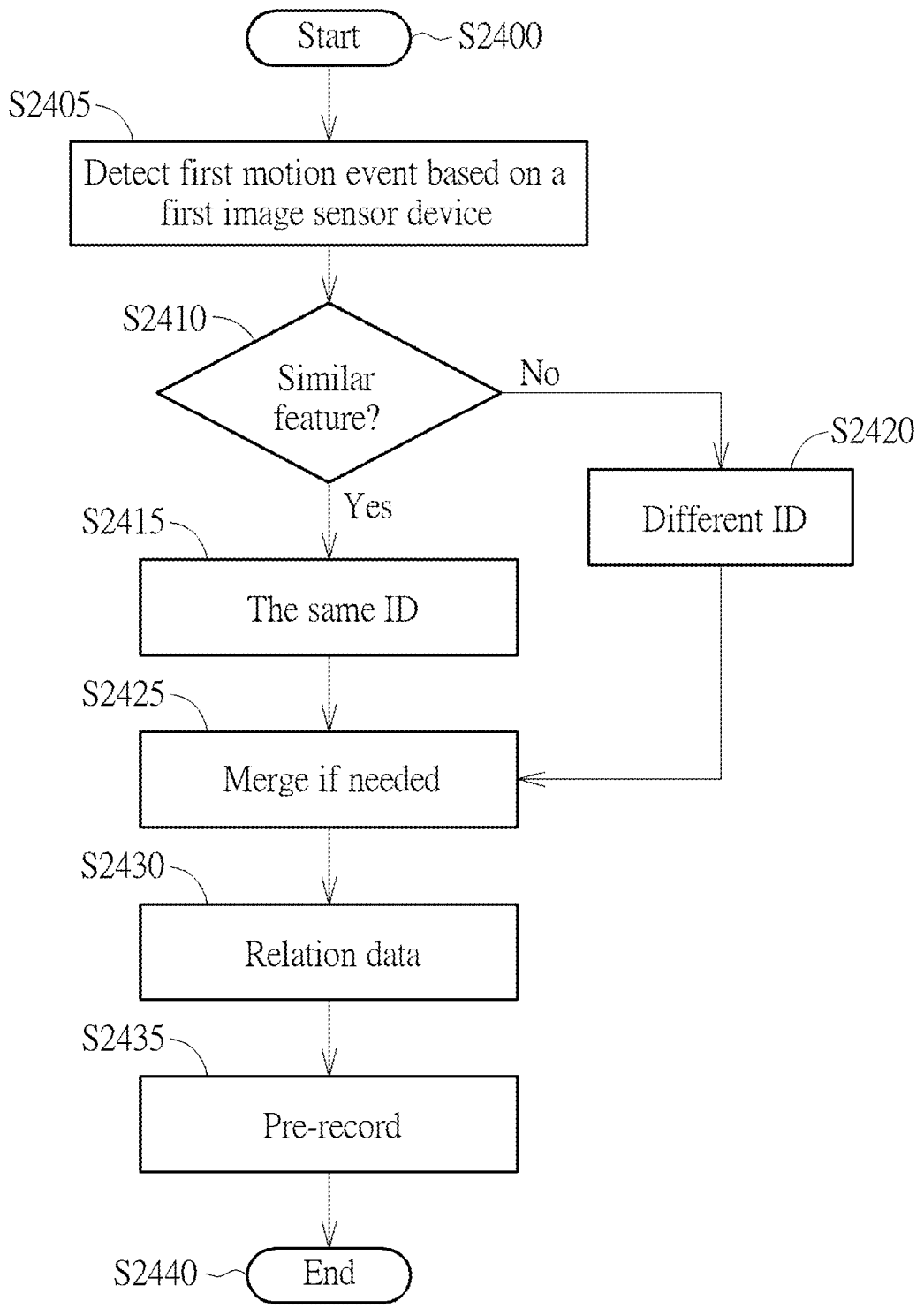
FIG. 24 is a flowchart diagram of the method of merging image streams of different image sensor devices and pre-recording image streams according to an embodiment of the invention.

To make readers more clearly understand the operation of merging the image streams of different image sensor devices and the operation of controlling an image sensor device pre-recording the image streams, FIG. 24 is provided. FIG. 24 is a flowchart diagram of the method of merging image streams of different image sensor devices and pre-recoding image streams according to an embodiment of the invention. The description of steps is described in the following:

Step S2400: start;

Step S2405: a first image sensor device captures image streams, detects a first motion event associated with a first motion object, and generates feature information of the first motion event;

Step S2410: the first image sensor device determines whether the feature information of the first motion event is similar or identical to that of a second motion event generated by a second image sensor device; if the feature information is similar/identical, then the flow proceeds to Step S2415, otherwise, the flow proceeds to Step S2420;

Step S2415: the first image sensor device uses the identification information of the second motion event as the identification information of the first motion event;

Step S2420: the first image sensor device uses different identification information as the identification information of the first motion event;

Step S2425: merge the image streams of the first and second motion event if the identification information is identical or similar;

Step S2430: generate and store the relation data of the first and second image sensor device based on the same identification data;

Step S2435: send the trigger signal to one of the first and second image sensor devices to make one image sensor device enter a monitoring mode to pre-record monitoring images when the another image sensor device is enabled and detects a motion object; and Step S2440: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detection method applied into an image sensor device, comprising:
providing a plurality of regions of interest (ROIs) on at least one monitoring image;
for each region of interest (ROI):
detecting whether at least one motion event occurs within the each ROI; and
determining a priority level of the each ROI according to at least one feature information of the at least one motion event; and
determining an alarm schedule of the ROIs for a user according to a plurality of priority levels of the RIOs.

2. The motion detection method of claim 1, wherein the at least one feature information of the at least one motion event comprises at least one of the following: a time of appearance/occurrence, a time which the at least one motion event disappears, a time length between the at least one motion event's occurring and disappearing, a frequency which the at least one motion event occurs, a regularity level which the at least one motion event occurs, at least one timestamp of the at least one motion event, a shape/color/size of at least one motion object in the at least one motion event, and a motion direction/speed of the at least one motion object.

3. The motion detection method of claim 1, further comprising:
detecting whether the at least one motion event occurs within the each ROI by detecting whether one or more motion objects occur within the each ROI; and
comparing one or more feature information of the one or more motion objects with candidate feature information to determine the at least one feature information of the at least one motion event.

4. The motion detection method of claim 3, further comprising:
tagging at least one unique identification information for the at least one motion event.

5. The motion detection method of claim 1, further comprising:
assigning different identification information for a plurality of motion events having at least one identical feature information;
classifying the plurality of motion events having the at least one identical feature information into a same event group; and
in response to the user's adjustment setting for a particular motion event in the plurality of motion events, determining one or more ROIs in which the plurality of motion events occur according to the different identification information, and then adjusting one or more priority levels of the one or more ROIs according to an identical adjustment of the user's adjustment setting.

6. The motion detection method of claim 1, further comprising:
transmitting a first notification to the user to notify the user of a first motion event occurring within a first ROI according to a first notification mode; and
transmitting a second notification to the user to notify the user of a second motion event occurring within a second ROI according to a second notification mode;
wherein the first notification mode is more urgent than the second notification mode when a priority level of the first ROI is higher than a priority level of the second ROI.

7. The motion detection method of claim 1, wherein the first notification mode is an instant notification mode, and the second notification mode is a later notification mode.

8. The motion detection method of claim 1, further comprising:
When detecting a first motion event within a first ROI on a first monitoring image generated from the image sensor device, generating a first feature information of the first motion event and a first timestamp;
searching a system storage, electrically coupled to another different image sensor device, according to the first feature information and the first timestamp, to obtain a second motion event within a second ROI on a second monitoring image generated from the another different image sensor device; and
using an identification information of the second motion event as an identification information of the first motion event to combine the second motion event with the first motion event.

9. A motion detection method applied into an image sensor device, comprising:
When detecting a first motion event within a first region of interest (ROI) on a first monitoring image generated from the image sensor device, generating a first feature information of the first motion event and a first timestamp;
searching a system storage, electrically coupled to another different image sensor device, according to the first feature information and the first timestamp, to obtain a second motion event within a second ROI on a second monitoring image generated from the another different image sensor device; and
using an identification information of the second motion event as an identification information of the first motion event to combine the second motion event with the first motion event.

10. The motion detection method of claim 9, further comprising:
in response to a user request corresponding to the second motion event, generating and outputting at least one image of the first motion event and at least one image of the second motion event for the user according to the identification information of the first motion event which is identical to the identification information of the second motion event.

11. The motion detection method of claim 9, wherein a second timestamp, corresponding to the second motion event, is followed by N timestamp followed by the first timestamp wherein a value of N ranges from zero to a threshold value.

12. The motion detection method of claim 9, wherein the first motion event is next to the second motion event which is obtained from the system storage based on a second timestamp previous to the first timestamp.

13. The motion detection method of claim 9, further comprising:
storing a relation between image sensor device and the another different image sensor device when the identification information of the second motion event is equal to the identification information of the first motion event;
receiving a trigger signal from the another different image sensor device, the trigger signal being generated when the another different image sensor device detects the second motion event; and powering on the image sensor device to sense one or more monitoring images according to the trigger signal and the relation, to pre-record the one or more monitoring images.

14. The motion detection method of claim 13, further comprising:
automatically generating and outputting a ranking list of a plurality of image sensor devices for the user according to one or more relations between the plurality of image sensor devices.

15. An image sensor device, comprising:
a sensing circuit, for generating at least one monitoring image and providing a plurality of regions of interest (ROIs) on the at least one monitoring image;
a processing circuit, coupled to the sensing circuit, configured for:
for each region of interest (ROI):
detecting whether at least one motion event occurs within the each ROI; and
determining a priority level of the each ROI according to at least one feature information of the at least one motion event; and
determining an alarm schedule of the ROIs for a user according to a plurality of priority levels of the RIOs.

16. The image sensor device of claim 15, wherein the at least one feature information of the at least one motion event comprises at least one of the following: a time of appearance/occurrence, a time which the at least one motion event disappears, a time length between the at least one motion event's occurring and disappearing, a frequency which the at least one motion event occurs, a regularity level which the at least one motion event occurs, at least one timestamp of the at least one motion event, a shape/color/size of at least one motion object in the at least one motion event, and a motion direction/speed of the at least one motion object.

17. The image sensor device of claim 15, wherein the processing circuit is arranged for:
detecting whether the at least one motion event occurs within the each ROI by detecting whether one or more motion objects occur within the each ROI; and
comparing one or more feature information of the one or more motion objects with candidate feature information to determine the at least one feature information of the at least one motion event.

18. The image sensor device of claim 17, wherein the processing circuit is further arranged for:
tagging at least one unique identification information for the at least one motion event.

19. The image sensor device of claim 15, wherein the processing circuit is further arranged for:
assigning different identification information for a plurality of motion events having at least one identical feature information;
classifying the plurality of motion events having the at least one identical feature information into a same event group; and
in response to the user's adjustment setting for a particular motion event in the plurality of motion events, determining one or more ROIs in which the plurality of motion events occur according to the different identification information, and then adjusting one or more priority levels of the one or more ROIs according to an identical adjustment of the user's adjustment setting.

20. The image sensor device of claim 15, wherein the processing circuit is further arranged for:
transmitting a first notification to the user to notify the user of a first motion occurring within a first ROI according to a first notification mode; and
transmitting a second notification to the user to notify the user of a second motion occurring within a second ROI according to a second notification mode;
wherein the first notification mode is more urgent than the second notification mode when a priority level of the first ROI is higher than a priority level of the second ROI.

21. The image sensor device of claim 1, wherein the processing circuit is further arranged for:
When detecting a first motion event within a first ROI on a first monitoring image generated from the image sensor device, generating a first feature information of the first motion event and a first timestamp;
searching a system storage, electrically coupled to another different image sensor device, according to the first feature information and the first timestamp, to obtain a second motion event within a second ROI on a second monitoring image generated from the another different image sensor device; and
using an identification information of the second motion event as an identification information of the first motion event to combine the second motion event with the first motion event.

22. An image sensor device, comprising:
a sensing circuit, for sensing a first monitoring image; and
a processing circuit, coupled to the sensing circuit, for:
detecting a first motion event within a first region of interest (ROI) on the first monitoring image generated from the sensing circuit;
generating a first feature information of the first motion event and a first timestamp;
searching a system storage, electrically coupled to another different image sensor device, according to the first feature information and the first timestamp, to obtain a second motion event within a second ROI on a second monitoring image generated from the another different image sensor device; and
using an identification information of the second motion event as an identification information of the first motion event to combine the second motion event with the first motion event.

23. The image sensor device of claim 22, wherein the processing circuit is further arranged for:
in response to a user request corresponding to the second motion event, generating and outputting at least one image of the first motion event and at least one image of the second motion event for the user according to the identification information of the first motion event which is identical to the identification information of the second motion event.

24. The image sensor device of claim 22, wherein a second timestamp, corresponding to the second motion event, is followed by N timestamp followed by the first timestamp wherein a value of N ranges from zero to a threshold value.

25. The image sensor device of claim 22, wherein the first motion event is next to the second motion event which is obtained from the system storage based on a second timestamp previous to the first timestamp.

26. The image sensor device of claim 22, wherein the processing circuit is further arranged for:
storing a relation between image sensor device and the another different image sensor device when the identification information of the second motion event is equal to the identification information of the first motion event;

receiving a trigger signal from the another different image sensor device, the trigger signal being generated when the another different image sensor device detects the second motion event; and powering on the image sensor device to sense one or more monitoring images according to the trigger signal and the relation, to pre-record the one or more monitoring images.

27. The image sensor device of claim 26, wherein the processing circuit is further arranged for:

automatically generating and outputting a ranking list of a plurality of image sensor devices for the user according to one or more relations between the plurality of image sensor devices.

* * * * *